(12) United States Patent
Kothari et al.

(10) Patent No.: US 11,797,479 B2
(45) Date of Patent: Oct. 24, 2023

(54) INTEGRATING OBJECT-BASED DATA INTEGRATION TOOL WITH A VERSION CONTROL SYSTEM IN CENTRALIZED AND DECENTRALIZED ENVIRONMENTS

(71) Applicant: Oracle International Corporation, Redwood Shores, CA (US)

(72) Inventors: Chetan Kothari, Bangalore (IN); John Westworth Leigh, Sonoma, CA (US); Robert Velisar, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 232 days.

(21) Appl. No.: 17/069,773

(22) Filed: Oct. 13, 2020

(65) Prior Publication Data
US 2021/0026804 A1 Jan. 28, 2021

Related U.S. Application Data

(63) Continuation of application No. 16/158,924, filed on Oct. 12, 2018, now Pat. No. 10,877,929, which is a
(Continued)

(51) Int. Cl.
*G06F 16/13* (2019.01)
*G06F 16/21* (2019.01)
(Continued)

(52) U.S. Cl.
CPC ............... *G06F 16/13* (2019.01); *G06F 8/71* (2013.01); *G06F 16/134* (2019.01);
(Continued)

(58) Field of Classification Search
CPC .... G06F 8/71; G06F 11/362; G06F 17/30595; G06F 17/30563; G06F 17/30575
USPC ....... 717/122, 120, 121, 101, 123, 124, 140, 717/100, 105, 108, 110, 125, 127, 128, 717/131, 137, 170, 171, 174, 176, 178; 705/7.14, 400, 7.13, 7.42, 14.23, 1.1, 705/26.1, 27.1, 28, 30, 300, 305, 31, 32,
(Continued)

(56) References Cited

U.S. PATENT DOCUMENTS 6,460,052 B1 * 10/2002 Thomas ................ G06F 16/219
707/999.203
7,421,458 B1 9/2008 Taylor et al.
(Continued)

OTHER PUBLICATIONS

U.S. Appl. No. 14/866,580, Non-Final Office Action dated Apr. 9, 2018, 23 pages.
(Continued)

*Primary Examiner* — Ken Hoang
(74) *Attorney, Agent, or Firm* — Kilpatrick Townsend & Stockton LLP

(57) ABSTRACT

The present disclosure relates generally to a data integration system that integrate an object based data integration tool, such a GUI-based data integration tools, with version control systems using a relational database repository for persistence. Examples of distributed version control systems include Git, Mercurial, and Bazaar, and examples of centralized version control systems include Subversion, CVS etc. in centralized or distributed environments.

3 Claims, 26 Drawing Sheets

Related U.S. Application Data continuation of application No. 14/866,707, filed on Sep. 25, 2015, now Pat. No. 10,120,917.

(60) Provisional application No. 62/115,577, filed on Feb. 12, 2015, provisional application No. 62/056,459, filed on Sep. 26, 2014.

(51) Int. Cl.
   *G06F 16/27*     (2019.01)
   *G06F 16/182*    (2019.01)
   *G06F 16/28*     (2019.01)
   *G06F 16/23*     (2019.01)
   *G06F 16/25*     (2019.01)
   *G06F 8/71*      (2018.01)

(52) U.S. Cl.
   CPC .......... *G06F 16/182* (2019.01); *G06F 16/183* (2019.01); *G06F 16/219* (2019.01); *G06F 16/2365* (2019.01); *G06F 16/254* (2019.01); *G06F 16/27* (2019.01); *G06F 16/284* (2019.01)

(58) Field of Classification Search
   USPC .......... 705/34, 347, 35, 37, 39, 40, 65, 7.17, 705/7.36, 7.38, 80; 707/E17.005, E17.01, 707/E17.044, 622, 999.001, 999.01, 707/E17.014, E17.016, E17.017, E17.032, 707/E17.045, E17.069, E17.104, E17.134, 707/610, 638, 722, 738, 752, 769, 803, 707/822, 999.004, 999.1, 999.103, 707/999.104, 999.107, 999.202
   See application file for complete search history.

(56) References Cited

U.S. PATENT DOCUMENTS

| | | |
|---|---|---|
| 7,953,710 B2 * | 5/2011 | Novik .................. G06F 16/273 709/201 |
| 8,266,122 B1 | 9/2012 | Newcombe et al. |
| 8,868,506 B1 | 10/2014 | Bhargava et al. |
| 10,015,271 B1 | 7/2018 | Chang et al. |
| 10,120,917 B2 | 11/2018 | Kothari et al. |
| 10,176,238 B2 | 1/2019 | Kothari et al. |
| 10,877,929 B2 | 12/2020 | Kothari et al. |
| 10,936,542 B2 | 3/2021 | Kothari et al. |
| 2004/0064488 A1 | 4/2004 | Sinha |
| 2005/0121871 A1 | 6/2005 | Arai et al. |
| 2005/0131871 A1 | 6/2005 | Howard et al. |
| 2008/0028033 A1 | 1/2008 | Kendall |
| 2013/0246996 A1 | 9/2013 | Duggal et al. |
| 2016/0004718 A1 | 1/2016 | Lin et al. |
| 2016/0092525 A1 | 3/2016 | Kothari et al. |
| 2016/0092526 A1 | 3/2016 | Kothari et al. |

OTHER PUBLICATIONS

U.S. Appl. No. 14/866,580, Notice of Allowance dated Aug. 23, 2018, 7 pages.
U.S. Appl. No. 14/866,707, Non-Final Office Action dated Mar. 14, 2018, 22 pages.
U.S. Appl. No. 14/866,707, Notice of Allowance dated Jun. 29, 2018, 8 pages.
U.S. Appl. No. 16/158,924, Non-Final Office Action dated Apr. 2, 2020, 17 pages.
U.S. Appl. No. 16/158,924, Notice of Allowance dated Jul. 23, 2020, 8 pages.
U.S. Appl. No. 16/216,368, Non-Final Office Action dated Aug. 7, 2020, 10 pages.
U.S. Appl. No. 16/216,368 , "Notice of Allowance", dated Dec. 2, 2020, 7 pages.

* cited by examiner

INTEGRATING OBJECT-BASED DATA INTEGRATION TOOL WITH A VERSION CONTROL SYSTEM IN CENTRALIZED AND DECENTRALIZED ENVIRONMENTS

CROSS-REFERENCE TO RELATED APPLICATIONS

This application is a continuation application of U.S. patent application Ser. No. 16/158,924, filed Oct. 12, 2018, issued as U.S. Pat. No. 10,877,929 on Dec. 29, 2020, which is a continuation of U.S. patent application Ser. No. 14/866,707, filed Sep. 25, 2015, issued as U.S. Pat. No. 10,120,917 on Nov. 6, 2018, which claims benefit of the filing dates of U.S. Provisional Patent Application Nos. 62/056,459 and 62/115,577, filed Sep. 26, 2014 and Feb. 12, 2015. The disclosures of the above-named applications are incorporated by reference herein in their entireties.

BACKGROUND

During design time, developers go through an incremental process of developing and testing logic in connection with a database or data warehouse by using a data integration tool, which is often referred to as an extraction, transport, transformation, and loading (ETL) tool. In the context of data integration, developers create and modify metadata artifacts representing data integration constructs. These metadata artifacts can be saved in a repository, such as a relational database, associated with the data integration tool the developer is using. Many times, while making changes to data integration business logic, a developer, such as a data integration developer, can inadvertently modify the current properly working logic with flawed logic (such as less efficient or non-functioning logic). Currently, developers manually attempt to re-create the earlier data integration business logic to recover from the flawed logic. In a team development setting, problems such as these can multiply and significantly impact developer productivity, leading to increased time to market.

BRIEF SUMMARY

Embodiments of the present invention integrate an object based data integration tool, such a GUI-based data integration tools, with version control systems using a relational database repository for persistence. Examples of distributed version control systems include Git, Mercurial, and Bazaar, and examples of centralized version control systems include Subversion, CVS etc. in centralized or distributed environments.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it can be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Embodiments of the present invention leverage version control systems (both centralized version control systems and decentralized version control systems) with data integration tools to track versions of the metadata artifacts that represent the data integration flow. Knowing the what, who, and when of changes enables developers to compare the performance of particular versions, working out when "bugs" were introduced (or fixed), the nature of such bugs, and the like. Any problems that arose from a change can then be followed up by an examination of what changes were made, who made the change, and the reasons given as to why and when for making the change. Embodiments of the present invention can integrate version control systems that are centralized or distributed with data integration tools in centralized or distributed development environments.

A large integration project can be developed quickly by leveraging data integration developers/teams located at several geographically distributed locations. Each location can be made responsible to develop one or more modules of a large integration project. To develop a data integration project in a team environment, the development repository associated with the data integration tool can enable sharing of objects across multiple repositories of the data integration tool. Integrating data integration tools with an external version control system can help to break down development repository between project groups/geographical boundaries and enable sharing of objects across multiple repositories of the data integration tool leading to effective distributed development.

Figure 1:
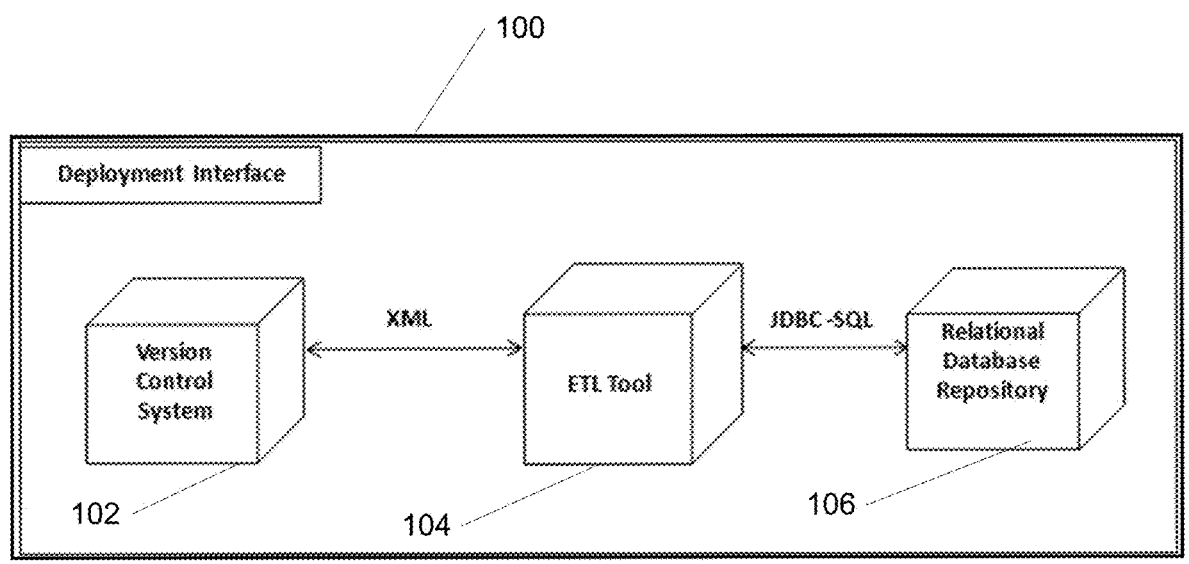
FIG. 1 illustrates a high level overview of a data integration system integrated with a version control system, in accordance with an embodiment of the present invention.

FIG. 1 illustrates a high level overview of a data integration system 100 that is integrated with a version control system 102, in accordance with an embodiment of the present invention. As shown in FIG. 1, at a high level, a data integration tool 104 (such as a data integration or ETL tool) can communicate with one or more data stores 106 (such as a relational database repository) and a version control system 102. In some embodiments, a data integration tool can be implemented in a distributed or centralized development environment. In some embodiments, centralized or distributed version control systems can be used with centralized or distributed development environments. As described further below, a centralized version control system, in which different versions of a data integration project are maintained in a centralized repository, can be implemented in a centralized development environment or a distributed development environment. Similarly, in some embodiments, a distributed version control system, in which each client maintains a separate version control repository, can be implemented in a distributed or centralized development environment.

Version control systems and data integration tools can have a number of different architectural differences. For example, data integration tools often use an object based representation persisted into a relational database (or other data store), while a version control system typically persists files corresponding to different versions of a given project. In some embodiments of the present invention, data integration metadata objects can be serialized as files (e.g., XML files) which can then be maintained and persisted in a version control system. The data integration tool can exchange database repository data with the version control systems using XML, files which can be stored in a hierarchical manner in the version control system. The hierarchy maintained in the centralized version controlled system can be determined based on how metadata artifacts are arranged in the data integration tool.

In some embodiments, the data integration tool can serialize objects to one or more files, e.g., XML files that can be stored and managed by a version control system. The data integration tool can exchange relational database repository data with the centralized version control systems using XML files which are stored in a hierarchical manner in the version control system. The hierarchy maintained in the version controlled system can be determined based on how the metadata artifacts are arranged in the data integration tool.

In some embodiments, the data integration tool can exchange relational database repository data with the distributed version control system using XML files which are stored in a hierarchical manner in the local version control system repository and the remote centralized version control system repository. The hierarchy maintained in the distributed version controlled system is determined by the way metadata artifacts are arranged in the data integration tool.

The various versions of an object maintained by the VCS can be represented as a graph or tree. When an object is developed serially (e.g., sequentially by the same developer or different developers) the version graph is represented as a linear series of nodes (where each node represents a new version). This linear series may be referred to as a trunk or mainline. In some embodiments, an object can be developed in parallel, which causes the version graph to split into branches. These branches can be merged back to the trunk. The merge operation reconciles the differences between the versions. This can require approval from one or more developers of which conflicting features are to be kept and which are to be discarded. Although text files can be merged relatively simply, more complicated files (such as those described here that represent metadata that defines data integration processes) require significant analysis to determine how the merge is to be performed.

In a centralized development environment that is integrated with a distributed VCS, data integration developers can be working on the shared relational database repository of the data integration tool which can be configured with the master branch present in the remote centralized version control system repository. The data integration tool can provide a mechanism to ensure that only one master branch is configured with a database repository of the data integration tool and vice versa. The remote centralized version control system repository serve as the single point-of-entry for all changes to the data integration project. Instead of trunk, the default development branch is called master and all changes are committed into this branch. This approach does not require any other branches besides master.

In a distributed development environment that is integrated with a distributed VCS, each of the distributed teams can be working on the separate relational database repository which can be configured with the feature/development branch present in the remote centralized Version Control System Repository. The data integration tool can provide a mechanism to ensure that only one development/feature branch is configured with a database repository of the data integration tool and vice versa. In this approach, all feature development can take place in a dedicated branch instead of the master branch. This encapsulation makes it easy for multiple data integration developers to work on a particular feature without disturbing the main codebase.

In some embodiments, using a distributed VCS each data integration developer can create a local version control system repository by cloning the remote centralized version control system repository and configure it with the data integration tool. This can create a local remote branch in the local version system repository.

In some embodiments, the data integration developer can connect to the centralized version control system using user identity information supported by the centralized version control system. The data integration tool can map the user identity information received to changes made by the user by tagging, or otherwise adding, the user identity information or other data corresponding to the user identity information to the commit messages sent to the version control system (both distributed and centralized version control systems).

In some embodiments, an object model can include a first class object (FCO) and a second class object (SCO). Editors can be used to edit an object model which is defined at FCO level. An FCO is usually the object that a user would consider as the top-level object for a "unit of work". Examples of FCOs in the data integration context can include Mapping, Package, Table, etc. An FCO may include other objects which are called second class object (SCOs), such as Mapping Components or Columns.

In some embodiments, the granularity of the versioning supported by the data integration tool can be a first class object which can exist by itself. A first class object can be a container or a non-container object. The first class object appears by itself in Treeview of the data integration tool and has its own editor. An object can logically be copied and pasted from one container to another. For example, some of the data integration tools have support for Load Plan. Load Plan is an executable object that can include a hierarchy of steps that can be executed conditionally, in parallel or in series. A load plan is a first class object while a load plan step is a second class object. In some embodiments, there can be one XML file per first class object in the version control system repository.

Versioning a container first class object can version the container object itself and all its descendants (e.g., re-versioned if newer than the version present in the version control system repository). The XML file of a container first class object can store a list of version controlled children and their versions.

In some embodiments, using a centralized VCS, the data integration tool can provide a mechanism to perform various version management operations like add non version controlled objects to the distributed version control system, create multiple versions of a version controlled object present in the data integration tool, restore a version controlled object from one of its past versions from the distributed version control system, restore a deleted version controlled object etc. from the trunk/branch present in the distributed version control system configured with the relational database repository of the data integration tool used by the data integration developer. The approach to support these operations can vary based on the type of the object—container/non container object.

In some embodiments, using a distributed VCS, the data integration developers can always perform version management operations on the local version control system repository present in their machine. The data integration tool can immediately push a commit done on the local version control system repository to the remote centralized version control system repository while executing various version management operations like adding, moving, deleting a version controlled object. In some embodiments, the data integration tool can pull changes from the remote centralized version control system repository to the local repository before executing any of the version management operations like restoring an object from one of its previous versions, restoring a deleted object, populating a database repository of the data integration tool etc.

As objects can be inter-dependent in the relational database repository of the data integration tool, in some embodiments the consistency of the relationships between objects can be guaranteed at the relational database repository level. In some embodiments, each first class object is versioned individually without versioning dependent objects. As such the remote centralized version control system repository may not represent a consistent/valid data integration metadata set. The data integration can synchronize the relational database repository of the data integration tool with the remote centralized version control system repository to bring a consistent set of objects from the relational database repository of the data integration tool to the remote centralized version control system repository In some embodiments, the data integration tool can lock its own database repository before starting the sync process to prevent any write operation on the database repository and prevent any version management operation. The database repository can be unlocked once the synchronize is done.

In some embodiments, a label (or tag) is a user supplied identification text that is used to identify a set of consistent object versions (or the entire repository) as the basis for persistence in the version control systems. The data integration tool can synchronize its database repository with the remote centralized version control system repository as part of creating a full or partial label/tag from the configured trunk/branch present in the remote centralized version control system repository. The database repository of the data integration tool can be synchronized with the remote centralized version control system repository while creating a full label. In some embodiments, a partial sync of selected objects, along with any dependent objects, can be performed while creating a partial table/tag in the remote centralized version control system repository.

In some embodiments, the label/tag can be used for populating a new empty database repository of the data integration tool, deploying new database repository of the data integration tool, applying patching in production environment or create a new development branch in the remote centralized version control system repository.

In a distributed environment, once development teams are done with the development, one or more options can be provided to merge development branches present in the remote centralized version control system repository as and when decided by project team. Branch merge is an operation that can result in conflicts which can be resolved by individual users over a period of time (could be several days). Such lengthy merge operations can be further complicated due to the particular semantics of data integration projects.

For example, Version Control System tools typically merge text files, with no knowledge of the structural and referential constraints between objects. Additionally, textual representation is not meaningful for the data integration developers, who are used to higher level of abstraction of the data integration metadata provided by graphical user interface-based data integration tools. This means that when different versions are in conflict, the average user may not be able to recognize and select the version that should be selected. Further, semantics of the data integration metadata object can only be validated within the data integration tool boundaries.

Figure 2:
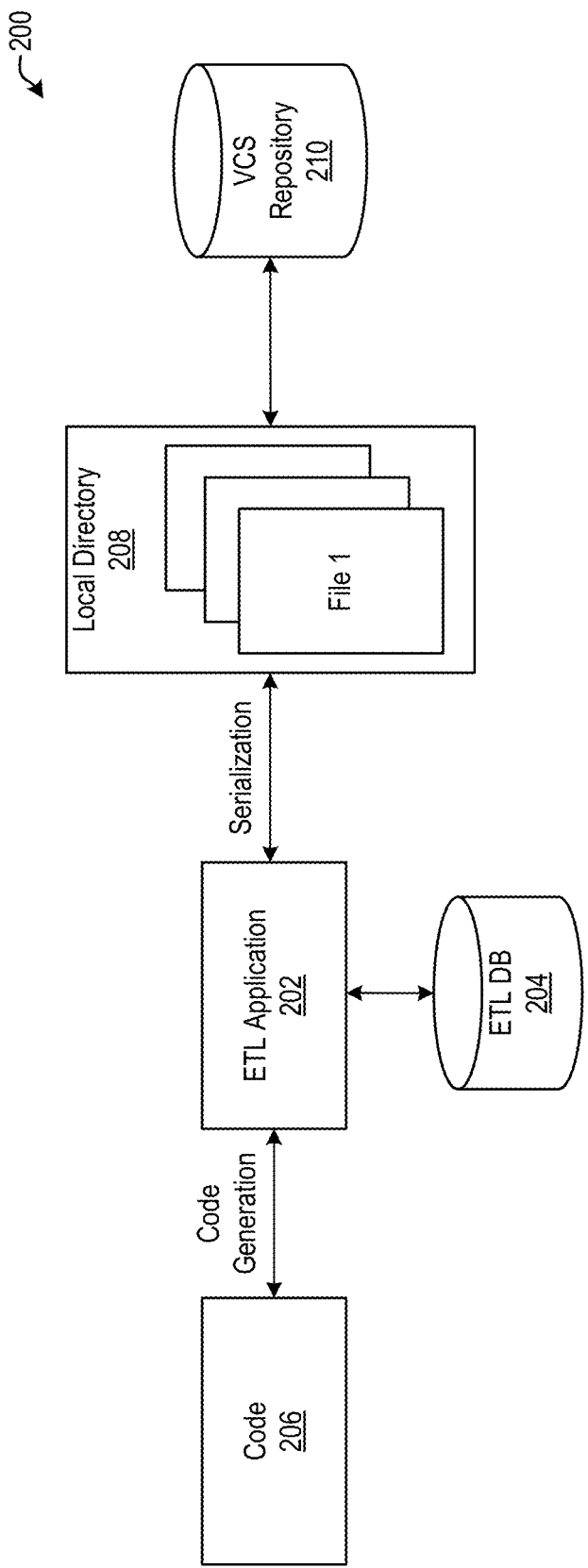
FIG. 2 illustrates a block diagram of a data integration system integrated with a version control system, in accordance with an embodiment of the present invention.

FIG. 2 illustrates a block diagram of a data integration system 200 integrated with a centralized version control system, in accordance with an embodiment of the present invention. As shown in FIG. 2, data integration system 200 can include a data integration application 202. In some embodiments, data integration application 202 can be executing locally on a user's workstation or local computer system, or remotely on a server that communicates with one or more clients. A developer can define data integration processes using data integration application 202. For example, the developer can define particular transforms and other operations to be performed on one or more data sources and can define one or more target data stores to which the results of the transforms and other operations are loaded. A local data integration repository 204 can store data representing the data integration processes (e.g., metadata). When the developer has completed the data integration process, the developer can request that the data integration application 202 generate code 206 that when executed can perform the operations defined by the developer.

In some embodiments, the developer can mark particular objects in the data integration application for version control. Versions of these objects can then be managed by a VCS integrated with the data integration system. When the developer saves a version of one of the marked objects, the marked object is serialized (e.g., converted into a storable file, such as an XML file) to local directory 208. Each serialized object file can then be stored in VCS repository 210. When a version of an object is requested, the corresponding file can be retrieved from VCS repository 210 and returned the local directory 208. The retrieved file can then be used to reconstruct the object in data integration application 202.

In some embodiments, an object-based data integration tool can be integrated with a with a centralized version control system. In other embodiments, an object-based data integration tool can be integrated with a distributed version control system. Each of these implementations is discussed further below.

Figure 3:
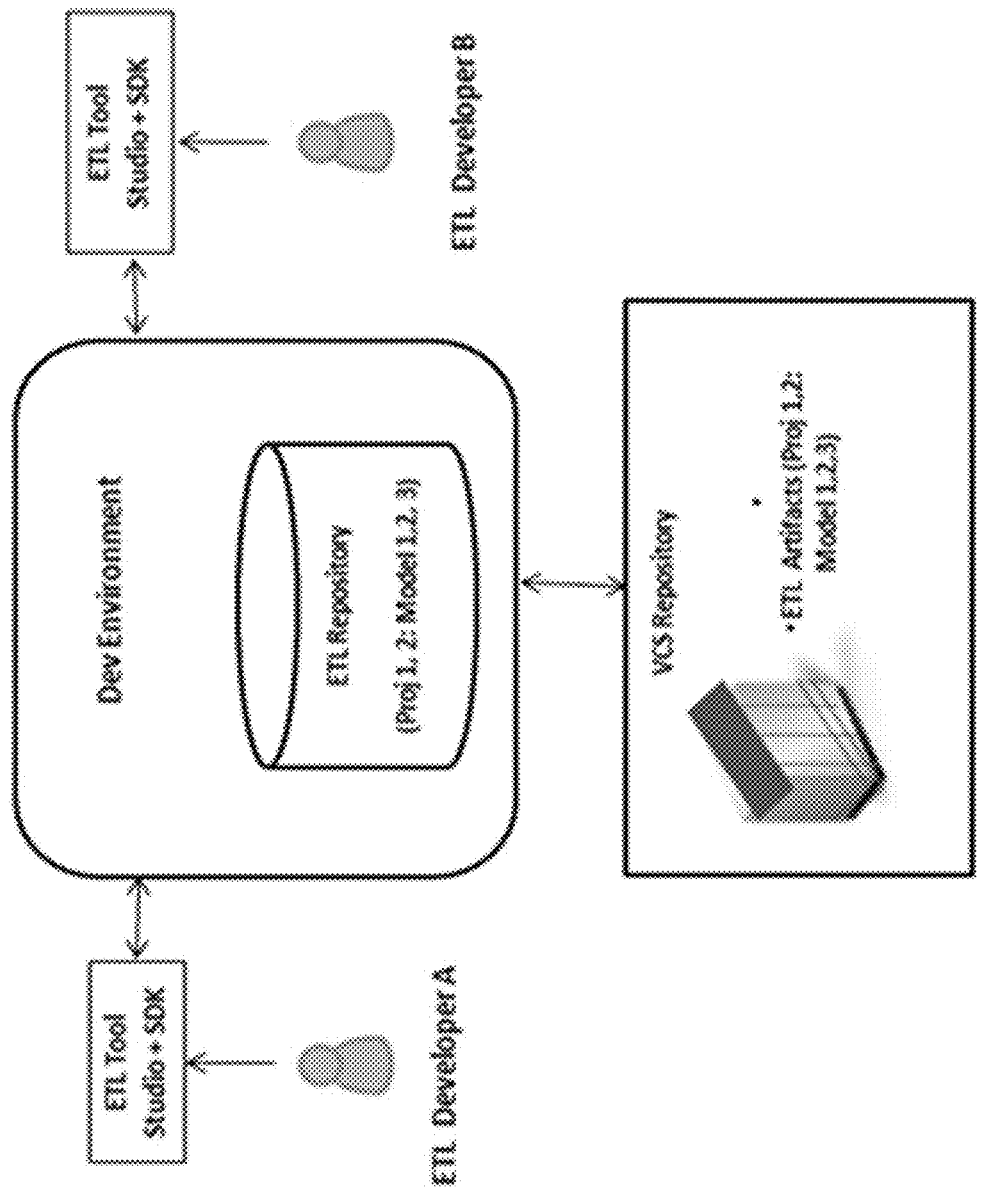
FIG. 3 illustrates a block diagram of a data integration system in a centralized development environment integrated with a centralized version control system, in accordance with an embodiment of the present invention.

FIG. 3 illustrates a block diagram of a data integration system in a centralized development environment integrated with a centralized version control system, in accordance with an embodiment of the present invention. As shown in FIG. 3, local VCS repositories are not cloned and maintained in distributed locations. Instead, multiple developers connect to a centralized development environment to use the data integration tool. The data integration tool, operating in this centralized development environment, can be configured and connected with a centralized VCS, such as Subversion, CVS etc. In some embodiments, in a centralized environment, a shared database repository can be used by multiple developers using a data integration tool for metadata persistence. In some embodiments, the shared repository of the data integration tool can be integrated with a branch/trunk of the version control system selected by an administrator. In some embodiments, the shared relational database repository of the data integration tool can be mapped to one trunk/branch present in the version control system repository by persisting information of a configured trunk/branch in the shared relational database repository of the data integration tool. Similarly, in some embodiments, a lock file in the trunk/branch of the version control system repository can be used to maintain a unique ID of the relational database repository of the data integration tool configured with the trunk/branch to ensure that only one relational database repository is mapped to the trunk/branch present in the version control system repository.

In the embodiment shown in FIG. 3, a data integration developer can perform version management operations using the centralized VCS repository by adding artifacts corresponding to objects in a data integration project to the centralized VCS. For example if the data integration developer creates a new object and wants to add the new object to the VCS repository, the developer can directly add the new object's artifact(s) (e.g., XML, artifact(s) exported from the new object) to the centralized VCS repository.

Similarly, the data integration tool can restore artifacts from the centralized VCS repository when the data integration tool is integrated with centralized version control systems as shown in FIG. 3. In some embodiments, the data integration tool integrated with centralized version control systems, as shown in FIG. 3, can export artifacts from the centralized VCS repository and then import it to the relational database repository while populating the data integration repository from the remote centralized VCS repository.

Embodiments of the present invention can synchronize the relational database repository of the object based data integration tool with the VCS repository to bring a consistent set of objects from the relational database repository of the data integration tool to the VCS repository.

User Identity Mapping between Data Integration and Version Control System

In some embodiments, changes made to a data integration project can be associated with the user making those changes based on an identity management service. For example, data integration developers can connect to the centralized version control system using a user identity provided by the centralized version control system. A data integration system can support different authentication and authorization systems, to authenticate and authorize users based on the type of centralized version control system used. User operations performed using the data integration tool and version management operations performed in the centralized version control systems can be associated with the relevant identity initiating these operations. For example, if a version controlled data integration artifact is modified and checked in, the data integration tool user identity and version control system user identity that was responsible for the change to the object can be identified. As such, in some embodiments, a data integration tool user name can be persisted as part of a log message which describes the changes that are committed to the version control system repository while executing a commit operation. This enables data integration tool user identity to be mapped with other user identity/OS user identity in the version history of an object.

Example Version Management Operations

Embodiments of the present invention enable data integration developers working on a shared relational database repository of the data integration tool to perform various version management operations, such as adding non-version controlled objects to the version control system, creating multiple versions of a version controlled object present in the data integration tool, and restoring a version controlled object from one of its past versions from the version control system. In some embodiments, container and non-container objects can be manipulated using data integration tools based on database repository, where non-container objects can be children of container objects. Embodiments of the present invention support operations for both container and non-container objects, such as those described in the following table, Table 1:

TABLE 1

| Object Type | Version Management Operation | Approach |
|---|---|---|
| Non Container | Add object to version control systems | Check if the parent objects of the selected object to be added to the version control system repository are version controlled in the relational database repository of the data integration tool. If not, add parent objects of the selected object to the version control system repository.<br>Selected objects present in the database repository of data integration tool can be exported as XML files which can be stored in the local working folder of the data integration Developer.<br>Exported ODI XML artifacts present in the working folder can be added to the version control system repository.<br>Maintain the version metadata information of the added objects in the relational database repository of the data integration tool<br>Delete the XML artifacts present in the working folder of the data integration Developer, which were previously exported from the relational database repository. |
| Non Container | Create Version of a version controlled object | Export object for which data integration Developer wants to create new version as XML artifact in the local working folder of data integration Developer<br>Get the last version of the artifact from VCS while applying delta as well as before committing artifact to the VCS. Commit will fail if the last version of the artifact present in the VCS before applying delta is different than last version of the artifact present in the VCS before committing artifact to the VCS. If both versions of the artifact are the same then do implicit commit of the XML artifact exported from the relational database repository of the data integration tool to the version control system repository.<br>Update the version information of the object in the relational database repository of the data integration tool |
| Non Container | Restoring object from one of its previous version | Import version controlled XML artifact from the version control system repository to the local working folder of the data integration developer<br>Provide mechanism to allow developer to restore an old version of the object using either With Merge or With No Merge option.<br>If data integration developers select restoring With No Merge option, then replace the object present in the database repository with object imported from XML artifact present in the version control system repository and provide inputs on the missing references detected if any once the XML artifacts are imported as objects in the data integration tool<br>If data integration developers select restoring With Merge option, then give option to data integration developer to merge objects present in the database repository of the data integration tool with the objects imported from the restored artifact.<br>Maintain the version information of the restored objects in the relational database repository of the data integration tool |

TABLE 1-continued

| Object Type | Version Management Operation | Approach |
|---|---|---|
| Non Container | Restoring an object deleted in the database repository. | To recover an object deleted in the database repository, it's first necessary to get the revision of the version control system repository it last existed in. Considering this, embodiments of the present invention provide mechanism to data integration Developer to browse all the deleted artifacts present in a trunk/branch of the version control system Repository configured with the data integration tool.<br>data integration tool can provide filter to restrict the output to a list of artifacts having path entered by data integration Developer in the filter criteria. This can help data integration Developer to find version of the artifact deleted in the version control system repository from which he wants to restore a version controlled object in the data integration tool.<br>Execute Copy operation provided by centralized version control systems to copy deleted XML artifact to the file system present in the version control system repository once data integration Developer triggers restore option.<br>Import version controlled XML artifact from the Version Control System Repository to the local working folder of the data integration Developer by using export operation provided by the centralized version control systems.<br>Import the restored XML artifact as object in the relational database repository and provide inputs on missing references if any in the database repository after restoring XML artifact as object in the data integration tool<br>Maintain the version information of the restored object in the relational database repository of the data integration tool<br>Delete the XML artifacts present in the working folder of the data integration Developer, which were previously exported from the relational database repository. |
| Container | Add object to version control systems | Check if the parent objects of the selected object to be added to the version control system repository are version controlled in the database repository of the data integration tool. If not, add parent objects of the selected object to the Version Control System.<br>Find child objects of the object to be added to the version control system repository. Provide option to data integration developer to select child objects which he wants to add to the version control system repository.<br>Selected objects present in the relational database repository of data integration tool can be exported as XML files which can be stored in the local working folder of the data integration developer.<br>Exported ODI XML artifacts present in the working folder can be added to the version control system repository.<br>Maintain the version metadata information of the added objects in the relational database repository of the data integration tool<br>Delete the XML artifacts present in the working folder of the data integration Developer, which were previously exported from the relational database repository. |
| Container | Create Version of a version controlled object | Detect child version controlled objects have changed in the relational database repository of the data integration tool since last saved/restored version.<br>Synchronize changes done on the version controlled container and its child objects due to delete, rename and move operation with the version control system repository. This can create new version of the version controlled objects which were changed in the relational database repository of the data integration tool due to rename/delete/move operation.<br>Create new version of the version controlled child objects which are changed in the relational database repository after last saved/restored version by performing following steps. |

TABLE 1-continued

| Object Type | Version Management Operation | Approach |
|---|---|---|
| | | Export parent container object and its all child objects as XML artifacts in the local working folder of data integration developer
Get the last version of the artifact from VCS while applying delta as well as before committing artifact to the VCS. Commit will fail if the last version of the artifact present in the VCS before applying delta is different than last version of the artifact present in the VCS before committing artifact to the VCS. If both versions of the artifact are the same then do implicit commit of the XML artifacts exported from the database Repository to the Version Control System Repository
Create new version of the version controlled container object if it changed or any of its child object is modified/removed/renamed/moved in the relational database repository after last saved/restored version by performing above steps.
Update the version information of the objects in the database repository of data integration tool |
| Container | Restoring object from one of its previous version | Import version controlled XML artifact from the version control system repository to the local working folder of the data integration developer
Parse the XML artifact to get inputs on the version controlled child objects and their version number
Import version controlled XML artifact corresponding to each of version controlled child object from the version control system repository to the local working folder of the data integration Developer
Provide mechanism to allow data integration Developer to restore an old version of the object using either With Merge or With No Merge option.
If data integration developers select restoring With No Merge option, then replace the object present in the relational database repository of the data integration tool with object imported from XML artifact present in the version control system repository and provide inputs on the missing references detected if any once the XML artifacts are imported as objects in the ODI Repository.
If data integration developers select restoring With Merge option, then give option to data integration developer to merge objects present in the relational database repository of the data integration tool with the objects imported from the restored artifact.
Maintain the version information of the restored objects in the relational database repository of the data integration tool |
| Container | Restoring an object deleted in the database repository. | To recover an object deleted in the database repository, it's first necessary to get the revision of the version control system repository it last existed in. Considering this, embodiments of the present invention provide mechanism to data integration Developer to browse all the deleted artifacts present in a trunk/branch of the version control system repository configured with the data integration tool.
data integration tool can provide filter to restrict the output to a list of artifacts having path entered by data integration Developer in the filter criteria. This can help data integration Developer to find version of the artifact deleted in the version control system repository from which he wants to restore a version controlled object in the data integration tool.
Execute Copy operation provided by centralized version control systems to copy deleted XML artifact to the file system present in the version control system repository once data integration Developer triggers restore option.
Export the artifact from the version control system repository to the working folder of the data integration Developer. Parse the exported XML artifact to get inputs on the version controlled child objects and their version number. |

TABLE 1-continued

| Object Type | Version Management Operation | Approach |
|---|---|---|
| | | Import version controlled XML artifacts from the version control system repository to the local working folder of the data integration Developer by using export operation provided by centralized version control systems. |
| | | Import the restored XML artifacts as objects in the relational database repository of the data integration tool and provide inputs on missing references if any in the database repository after restoring these XML artifacts as objects in the data integration tool |
| | | Maintain the version information of the restored objects in the relational database repository of the data integration tool |
| | | Delete the XML artifacts present in the checkout working folder of the data integration Developer. These XML artifacts were exported from the version control system repository to the working folder of the data integration Developer |

Managing Object Interdependencies and Synchronization of a Data Integration Repository with a Version Control System Embodiments of the present invention manage interdependencies of objects in a data integration project while creating a label/tag in the version control system repository. A label (or tag) can be a user supplied identification text that is used to identify a set of consistent objects versions (or the entire repository) in the centralized version control system. A consistent set of object versions are the version controlled objects stored in the version control system repository from which a structurally and semantically valid relational database repository of the data integration tool can be populated. For example, each object in a data integration project may not be updated in each version; the labels/tags enable the user to identify which version of each object is associated with a version of a project. Labels/tags can be used for deploying a new repository, applying patching in production environment or create development branch in the version control system repository.

In some embodiments, interdependencies of each object can be identified while creating a partial label/tag:
1. Get the links or relationships of an object
2. For each link L in links or relationships, get the parent, child or referenced object R
3. Set the dependency relationship and save R as dependency
4. Repeat step 1 on R recursively to get list of all the dependent objects for an object As objects are interdependent in the relational database repository of the data integration tool, consistency of the relationships between objects can be guaranteed at the relational database repository level. By versioning every first class object individually without versioning dependent objects, the tip of the trunk/branch may not represent a consistent/valid data integration metadata set. The relational database repository of the data integration tool can be synchronized with the version control system repository to bring a consistent set of objects from the relational database repository of the data integration tool to the version control system repository. Synchronization can be performed while creating full or partial labels/tags from the configured trunk/branch present in the version control system repository. A label (or tag) is a user supplied identification text that is used to identify a set of consistent objects versions (or the entire repository) in centralized version control system. A label/tag can be used for deploying new repository, applying patching in production environment or create development branch in the version control system repository Many data integration tools enable users to delete, rename, cut and paste/drag and drop objects while developing data integration projects. In some embodiments, changes (e.g., due to delete, rename or move operations) made to a project by a data integration developer can be tracked for each object in a project in a version table in the relational database repository of the data integration tool. During sync process, renamed/deleted/moved child version controlled objects can be synchronized with the version control system repository. In some embodiments, the following approach can be used to synchronize the database repository of the data integration tool with the version control system repository:

Provide mechanism to lock the relational database repository of the data integration tool by maintaining a lock flag in the relational database repository of the data integration tool before starting sync process.

Disable all version management operations so that no data integration Developer can perform version management operation when sync is in progress Provide mechanism to throw the exception when any of the transaction initiated for write operation is about to be committed to the relational database repository of the data integration tool Find the list of version controlled container objects present in the version table maintained in the relational database repository of the data integration tool. Execute following action for each container object:
  Detect version controlled child object which are modified/renamed/moved/deleted in the relational database repository of the data integration tool.
  Synchronize renamed/deleted/moved version controlled child objects with the version control system repository which can also create new version of these objects.
  Update version information in the Version Table for renamed/moved objects once they synced up with the version control system repository
  Remove rows present in the Version table corresponding to object marked as deleted once deleted objects are synced up with the version control system repository Create new version of remaining modified version controlled child objects. Update version information of child object in the Version table maintained in the relational database repository of the data integration tool Create version of container object if any of the child is modified/deleted/moved/renamed or parent container object itself is modified/deleted/moved/renamed in the database repository. Update version information of container object in the Version table maintained in the relational database repository of the data integration tool Find all the non-version controlled objects present in the database repository of the data integration tool. Add all non-version objects to the version control system repository. Add version information of the added objects in the Version table maintained in the relational database repository of the data integration tool Unlock the relational database repository of the data integration tool by clearing the lock flag maintained in the relational database repository of the data integration tool once synchronize is over This simplifies the development process for data integration developers who now do not have to worry about managing inter-file dependency and syncing up database repository of the data integration tool with the Version Control System Repository as explained above.

Figure 4:
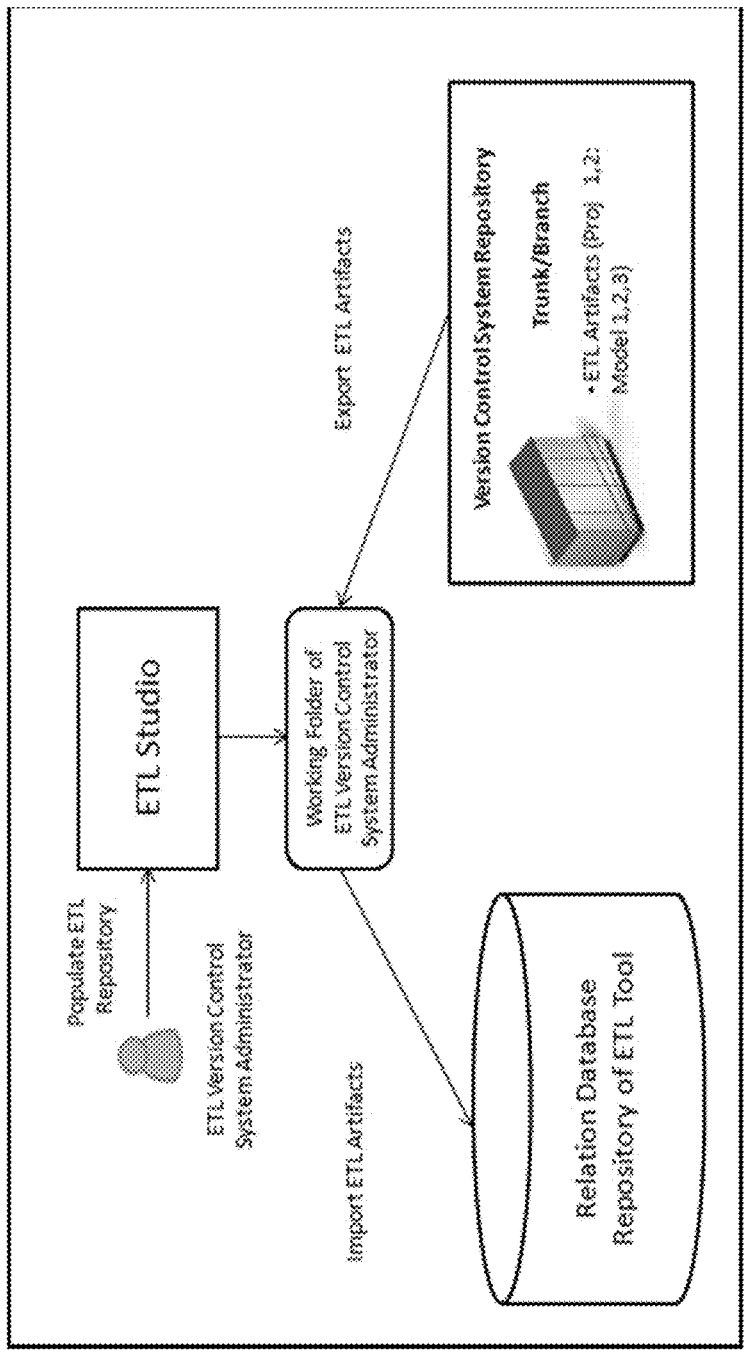
FIG. 4 illustrates a high level diagram of populating a data store based on artifacts maintained by a centralized version control system, in accordance with an embodiment of the present invention.

FIG. 4 illustrates a high level diagram of populating a data store based on artifacts maintained by a centralized version control system, in accordance with an embodiment of the present invention. In some embodiments, a version control system administrator can populate a newly created relational database repository of the data integration tool from the XML artifacts present in the tag/label present in the version control system repository. As described above, the set of artifacts in the tag/label of the version control system can be kept consistent using user defined labels/tags. This allows the VCS to be used to recreate a structurally and semantically valid relational database repository consistent state of the relational database repository of the data integration tool.

In some embodiments, the following method can be used to populate a relational database repository (or other data store) of the data integration tool from version control system repository Provide mechanism to the data integration Version Control System Administrator to create branch from the label/tag present in the version control system repository and configure it with the newly created relational database repository of the data integration tool Provide mechanism to the data integration Version Control System Administrator to initiate a populate database repository of the data integration tool from the configured branch present in the version control system repository.

Leverage export option provided by Version Control System to import artifacts present in the branch of the version control system repository to the local working folder of the data integration Version Control System Administrator's machine.

Import data integration XML artifacts as objects in the relational database repository of the data integration tool.

Provide inputs on the imported artifacts, missing references if any to the data integration Version Control System Administrator once all the artifacts are imported to the data integration repository.

Persist version metadata information of the imported objects into VERSION table present in the relational database repository of the data integration tool.

Delete the XML artifacts present in the working folder of the data integration Developer, which were previously exported from the relational database repository.

In some embodiments, when a VCS is initially added to a data integration tool, an administrator can configure a relational database repository (or other data store) of the data integration tool with an empty trunk/branch present in the version control system repository and add the non-version controlled objects to the centralized version control system. Additionally, a new relational database repository of the data integration tool can be restored from the database backup and then a restored ODI Repository can be populated from a trunk/branch configured with the VCS repository as described below.

Restore a new data integration Repository from the database backup

Configure a restored data integration Repository with the last configured trunk/branch. Provide warning message before changing the GUID of the data integration Repository present in the lock file of the last configured branch/trunk Remove all the entries from SNP_VCS_VERSION table.

Leverage export option provided by Version Control System to import artifacts present in the branch of the version control system repository to the local working folder of the data integration Version Control System Administrator's machine.

Import data integration XML artifacts as objects in the relational database repository of the data integration tool.

If no object with GUID same as GUID present in the imported data integration XML artifact, then import corresponding data integration XML, artifact as a new version controlled object in the data integration Repository Persist version metadata information of the imported data integration Objects in the VERSION table present in the data integration Repository.

Display the import report to the data integration VCS Administrator. The import report can give details on the imported objects, missing references detected after the import and the missing references fixed during the import.

Delete the XML artifacts present in the working folder of the data integration Developer, which were previously exported from the relational database repository.

Figure 5:
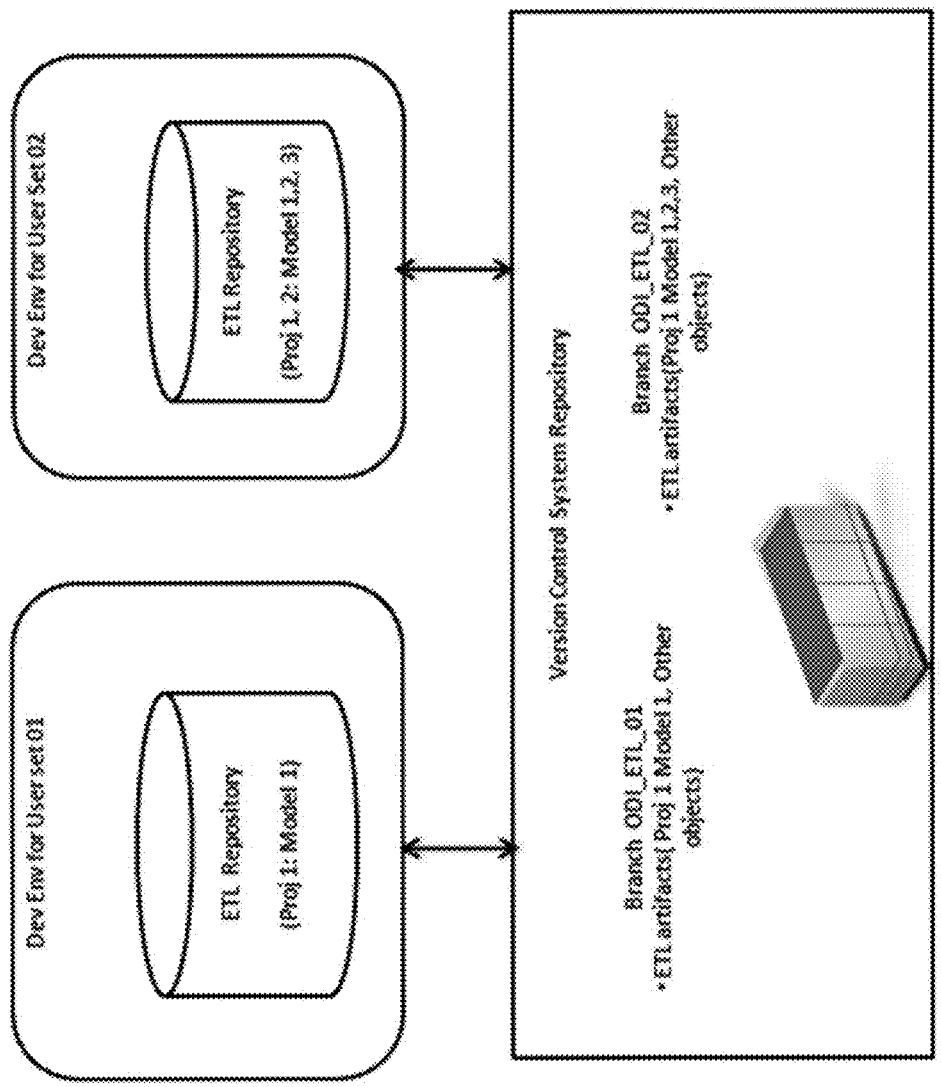
FIG. 5 illustrates a block diagram of a centralized data integration system in a distributed development environment integrated with a centralized version control system, in accordance with an embodiment of the present invention.

Integrating an Object-based Data Integration Tool with a Version Control System in a Distributed Environment FIG. 5 illustrates a block diagram of a data integration system in a distributed development environment integrated with a centralized version control system, in accordance with an embodiment of the present invention.

Integrating object based data integration applications with version control systems in a centralized environment, solving inter-file dependency issues and syncing the relational database repository of the data integration tool with the version control system repository enables the data integration developer to try different modifications to the logic without having to worry about a negative impact to the previously developed logic leading to increased productivity and reduced time to market which helps enterprise to reduce total cost of ownership.

Similarly a mechanism to populate a relational database repository of the data integration tool from the artifacts present in the trunk/branch of the version control system repository, configuring the relational database repository of the data integration tool to an empty version control System repository and creating a label/tag from the artifacts present in the version control system Repository enables data integration Administrator to address multiple aspects of life cycle management of data integration tool by integrating data integration tool with an external version control system.

During development of a large integration project, developers are often located at several geographically distributed locations. Each location develops one or more modules of a large integration project. Locations may be situated near one another and connected by a high speed network, or they may be distributed across multiple continents and have poor network connectivity or no network connectivity. Parallel development is more difficult in a geographically distributed environment. Time zone differences, language barriers, network access and other problems complicate communication and coordination among team members. Coordinating software development changes becomes more complex as the number of locations increases.

Previously, data integration tools provided access to a centralized, shared repository across a network to data integration developers working across multiple locations. This approach has significant issues like vulnerability to network problems due to the need to access the central repository:

Unacceptable performance speed due to frequent accesses to the central repository over a relatively low bandwidth and high network latency Network and scaling problems for systems having large numbers of users requiring remote access to a central repository.

The load on the central server increases with the number of users in the network Considering these issues faced by data integration developers in a distributed environment, embodiments of the present invention use centralized version control systems to coordinate integration project activities in scenarios such as this. In some embodiments, distributed teams can each work on separate database repositories that are mapped to a development branch present in the version control system repository. Each of the distributed teams can work with their respective database repository and development branch present in the version control system repository. Each of the distributed teams can perform version management operations like creating new versions of a version controlled object, adding a non-version controlled object to the version control system repository, restoring a version controlled object from one of its previous version etc. from their respective database repository to the configured trunk/branch present in the version control system repository as described above.

Once development teams are done with the development; they can merge development branches present in the version control system repository as and when decided by project team. Branch merge is a serious operation and could result in many conflicts. These conflicts can be resolved by individual owners over a period of time (could be several days). It is not feasible to use merging feature provided by the centralized version control systems as most of the data integration tools rely on object based persistence. Instead, the following merge operations can be performed:

An administrator can initiate the branch merge operation and the database repository of the data integration tool can go into a merge phase. Metadata information of branch merge operation can be maintained in the Merge table in the relation database repository of the data integration tool from where branch merge is initiated Information of every object that are part of the merge, can be added to the Merge Object table which can be used as a source for knowing what objects have been merged and which of these have conflicts that need to be resolved.

After the branch merge has been initiated and the objects that have merge conflicts identified, developers to find objects for which they are responsible that have merge conflicts outstanding. A data integration developer can work to resolve a merge conflict regardless to if it is assigned to them or not. To perform the merge, two versions of the object—branch version can be compared with the repository object. This can help the data integration developer to determine which of the two has more "differences" that are needed. The object with more differences can be used as starting point for doing the merge. A data integration developer can be using editor provided by data integration tool to resolve conflict.

The status of the Merge object table present in the relation database repository of the data integration tool can be updated once conflict is resolved. Even new version of object after resolving conflict can be added to the version control system repository.

The status of the Merge table can be updated once merge operation is complete. Record this merge in the Version Control System so that merge information can be retried while showing version tree of the object to the data integration Developer.

Figure 6:
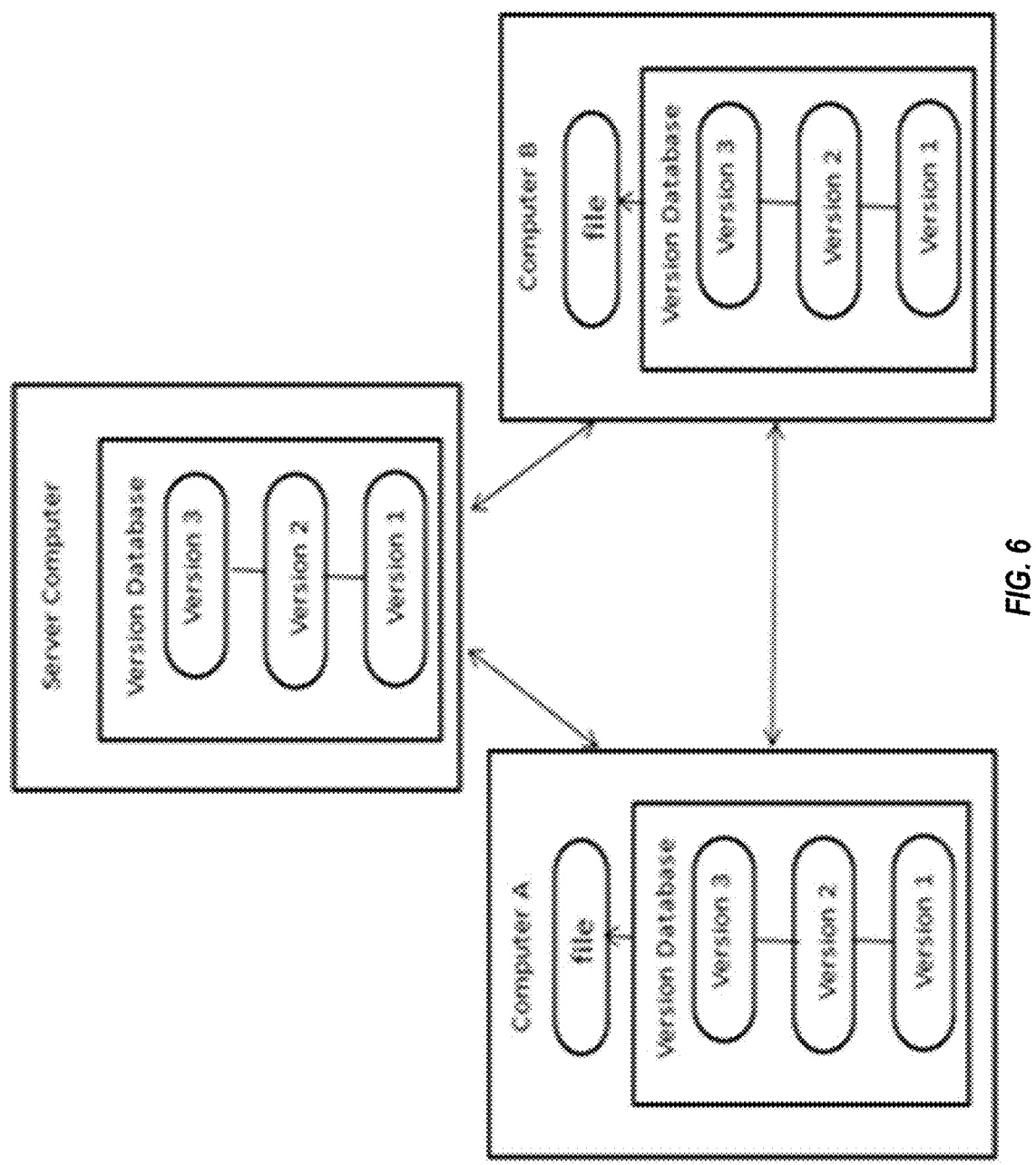
FIG. 6 illustrates a high level diagram of a distributed version control system, in accordance with an embodiment of the present invention.

FIG. 6 illustrates a high level diagram of a distributed version control system, in accordance with an embodiment of the present invention. As described above, version control systems (VCSs) can be generally divided into two groups: "centralized" and "distributed". Version control systems like Subversion (SVN), CVS, and Perforce are classified as Centralized Version Control Systems while version control systems like Git, Mercurial, and Bazaar are classified as distributed version control systems. Various differences exist between centralized and distributed version control systems that may impact how the VCS can be integrated with a data integration tool.

Centralized version control systems are based on the idea that there is a single "central" copy of a project somewhere (probably on a server), and developers can "commit" their changes to this central copy. "Committing" a change refers to recording the change in the central system. Other developers can then see this change. They can also pull down the change, and the version control tool can automatically update the contents of any files that were changed.

One difference between a centralized version control system and a distributed version control system is that distributed version control system does not necessarily rely on a central server to store all the versions of a project's files. Instead, every developer "clones" a copy of a remote server repository and this local repository copy (or "clone") has all of the metadata of the original. As shown in FIG. 6, Computer A and Computer B each include a local version database that is a clone of the version database maintained by Server computer. Thus if a server dies, any of the client local repositories can be copied back up to the server to restore it. The mechanism of getting changes from a remote server repository to local repository is usually called "pulling or fetching," and the mechanism of moving changes to a remote server repository from local repository is called "pushing".

In a centralized environment, all the data integration developers can be working on the shared relational database repository leveraged by the data integration tool. The shared relational database repository as shown in following figure can be mapped to a remote centralized version control system repository. Each of the data integration developer can be having the local version control system repository in their local machine. Each of the data integration developer can clone the remote centralized version control system repository to create the local Version Control System repository in their machine and configure the local version control system repository with the data integration tool.

Embodiments of the present invention can ensure that the relational database repository of the data integration tool is mapped to only one master branch in the remote centralized version control system repository by persisting information of the configured master branch in the relational database repository of the data integration tool. Similarly, the approach can provide a lock file in the master branch of the remote centralized version control system repository which can maintain a unique id of the relational database repository of the data integration tool configured with the trunk/branch to ensure that only one relational database repository is mapped to the master branch present in the remote centralized version control system repository.

Figure 7:
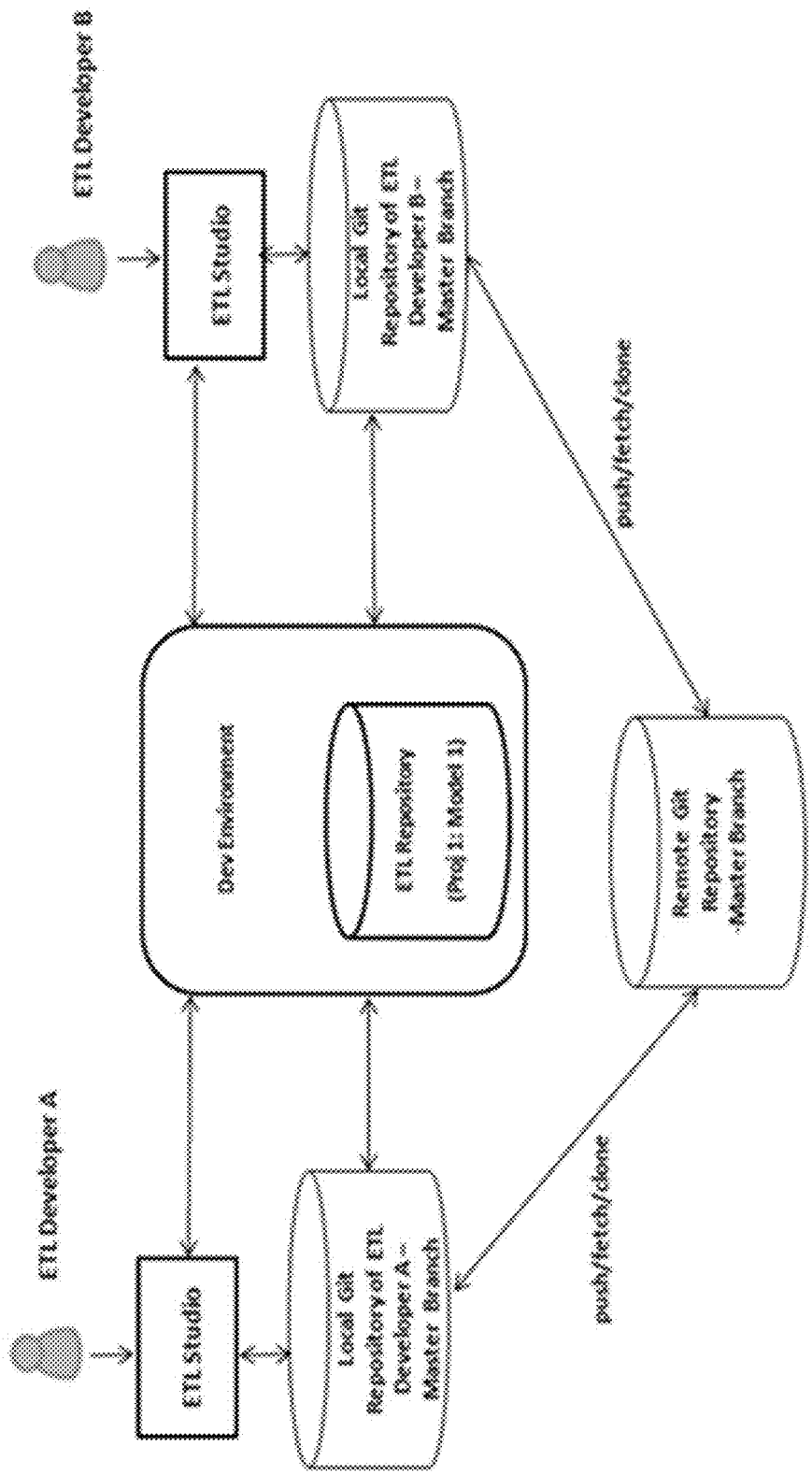
FIG. 7 illustrates a block diagram of a data integration system in a centralized development environment integrated with a distributed version control system, in accordance with an embodiment of the present invention.

FIG. 7 illustrates a block diagram of a data integration system in a centralized development environment integrated with a distributed version control system, in accordance with an embodiment of the present invention. As shown in FIG. 7, a data integration tool can be configured and connected with both a local VCS repository and remote centralized VCS repository. In the example shown in FIG. 7, the data integration tool at both Developer A and Developer B (indicated as data integration Studio) is connected to a local Git repository, and each data integration tool is connected to a remote Git repository. Although Git is used as the VCS in the embodiment shown in FIG. 7, any distributed VCS can be used. Each data integration developer can create their local VCS repository by cloning the remote VCS repository. Version management operations can then be performed on the local VCS repository. In some embodiments, the data integration tool can first synchronize the relational database repository of the data integration tool with a local VCS repository and then push changes from the local VCS repository to the remote, centralized VCS repository. In some embodiments, when merging development branches (e.g., resulting from parallel development by multiple, distributed developers), a data integration tool integrated with distributed version control system can first pull the development branches to be merged from the remote centralized VCS repository to the local VCS repository, and then initiate the custom merging process.

In some embodiments, the data integration developers can perform version management operations on the local VCS repository present in their machine when the data integration tool is integrated with a distributed version control system like Git. The data integration tool can push updates that have been successfully committed on the local VCS repository to the remote centralized VCS repository while executing various version management operations like adding, moving, deleting a version controlled object. For example if a data integration developer creates a new object and wants to add the new object to the VCS repository, the developer first adds the new object to the developer's local VCS repository. When the developer's local repository has been successfully updated, the data integration tool can push the new object from the local VCS repository to the remote centralized VCS repository.

In some embodiments, data integration tool can always pull changes from the remote centralized VCS repository to the local VCS repository before executing any of the version management operations like restoring an object from one of its previous versions, restoring a deleted object from the remote centralized VCS repository. For example if the data integration developer has to restore the new object from the remote centralized VCS repository, data integration tool can first pull the new object artifact from the remote centralized VCS repository to the local VCS repository and then provide option to data integration developer to restore it from the local VCS repository In some embodiments, the data integration tool integrated with distributed version control systems, as shown in FIG. 7, can pull artifacts from master branch/development branch of the remote centralized VCS repository to the local VCS repository and then import it to the relational database repository while populating the local data integration repository from the remote centralized VCS repository.

In some embodiments, the data integration tool can directly sync the relational database repository with the centralized VCS repository when the data integration tool is integrated with the centralized version control system. Additionally, in some embodiments, the data integration tool integrated with a centralized version control system can directly merge the development branches present in the centralized VCS repository using a custom merging process.

User Identity Mapping Between a Data Integration System and a Version Control System In some embodiments, developers can connect to the remote Version Control System repository using user identity provided by Version Control System. Each of the version control system provides different authentication and authorization mechanism to authenticate and authorize users based on the architecture of the Version Control System. Embodiments enable data integration developers to connect to the Version Control System using various authentication mechanism provided by Version Control System. User operations in data integration tool and subsequently in Version Control Systems can be identified with the relevant identity initiating these operations. For example, if a data integration artifact is modified and checked in, the data integration tool User Identity and Version Control System User Identity of the user who was responsible for the change to the object can be associated with the modifications. Embodiments of the present invention can persist a User Name (or other ID maintained by the data integration tool) as part of a log message which describes the changes that are committed to the local and remote version control system repository while executing commit operation. This facilitates mapping data integration tool User Identity with other user identity/OS User identity while showing version history of an object.

Version Management Operations

Embodiments of the present invention can enable data integration developers working on the shared database repository of the data integration tool to perform various version management operations like add non version controlled objects to the version control system, create multiple versions of a version controlled object present in the data integration application and restore a version controlled object from one of its past versions from the version control system. Developers can perform version management operations on the local version control system repository present in their machine. Data integration tools can push these changes to/pull changes from the remote centralized Version Control System repository as shown in the above figure.

As described above, in many data integration tools based on relational database repository, there is concept of container and non-container objects where non container objects are child of container objects. Embodiments of the present invention perform version management operations for both container and non-container objects as described in following table, Table 2.

TABLE 2

| Object Type | Version Management Operation | Approach |
|---|---|---|
| Non Container | Add object to version control systems | Check if the parent objects of the selected object to be added to the remote centralized version control system repository are version controlled in the relational database repository of the data integration tool. If not, add parent objects of the selected object to the remote centralized version control system repository.<br>Selected objects present in the relational database repository of the data integration tool can be exported as XML files which can be stored in the local working directory of the data integration Developer.<br>Exported ODI XML artifacts present in the working folder can be added to the local version control system repository present in the local machine of the data integration Developer<br>ODI XML artifacts added to the local version control system repository can be immediately pushed to the remote centralized Version Control System Repository.<br>Maintain the version metadata information of the added objects in the relational database repository of the data integration tool<br>Delete the XML artifacts present in the working folder of the data integration Developer, which were previously exported from the relational database repository. |
| Non Container | Create Version of a version controlled object | Export object for which data integration Developer wants to create new version as XML artifact in the local working directory of data integration Developer<br>Get the last version of the artifact from VCS while applying delta as well as before committing artifact to the VCS. Commit can fail if the last version of the artifact present in the VCS before applying delta is different than last version of the artifact present in the VCS before committing artifact to the VCS. If both versions of the artifact are same then perform implicit commit of the XML artifact exported from the relational database repository of the data integration tool to the local Version Control System Repository<br>Implicit push of the committed XML artifact to the remote centralized version control system repository<br>Update the version information of the object in the relational database repository of the data integration tool |
| Non Container | Restoring object from one of its previous version | Pull the version controlled XML artifact from the remote centralized version control system repository to the local repository of the data integration Developer<br>Import version controlled XML artifact from the local version control system repository to the local working folder of the data integration developer<br>Provide mechanism to allow developer to restore an old version of the object using either With Merge or With No Merge option.<br>If data integration developers select restoring With No Merge option, then replace the object present in the database repository with object imported from XML artifact present in the local version control system repository and provide inputs on the missing references detected if any once the XML artifacts are imported as objects in the data integration tool.<br>If data integration developers select restoring With Merge option, then give option to data integration developer to merge objects present in the relational database repository of the data integration tool with the objects imported from the restored artifact.<br>Maintain the version information of the restored objects in the relational database repository of the data integration tool |
| Non Container | Restoring an object deleted in the database repository. | To recover an object deleted in the database repository, its first necessary to get the revision of the remote centralized version control system repository it last existed in. Considering this, embodiments of the present invention provide mechanism to data integration Developer to browse all the deleted artifacts present in a master branch of the remote centralized version control system repository |

TABLE 2-continued

| Object Type | Version Management Operation | Approach |
|---|---|---|
| | | configured with the data integration application/tool. Data integration tool can provide filter to restrict the output to a list of artifacts having path entered by data integration Developer in the filter criteria. This can help data integration Developer to find version of the artifact deleted in the remote centralized version control system repository from which he wants to restore a version controlled object in the data integration application/tool. Execute Copy operation provided by Version Control Systems to copy deleted XML artifact to the file system present in the remote centralized version control system repository once data integration Developer triggers restore option. Pull version controlled XML artifact from the remote centralized version control system repository to the local version control system repository of the data integration Developer Import the version controlled XML artifact from the local version control system repository to the local working folder of the data integration Developer. Import the restored XML artifact as object in the relational database repository of the data integration tool and provide inputs on missing references if any in the database repository after restoring XML artifact as object in the data integration tool Maintain the version information of the restored object in the relational database repository of the data integration tool |
| Container | Add object to version control systems | Check if the parent objects of the selected object to be added to the remote centralized version control system repository are version controlled in the database repository of the data integration tool. If not, add parent objects of the selected object to the remote centralized Version Control System Repository. Find child objects of the object to be added to the remote centralized Version Control System Repository. Provide option to data integration developer to select child objects which he wants to add to the remote centralized Version Control System Repository. Selected objects present in the relational database repository of the data integration tool can be exported as XML files which can be stored in the local working directory of the data integration developer. Exported ODI XML artifacts present in the working directory can be added to the local version control system repository present in the local machine of the data integration Developer. ODI XML artifacts added to the local version control system repository can be immediately pushed to the remote centralized version control system repository. Maintain the version metadata information of the added objects in the relational database repository of the data integration tool Delete the XML artifacts present in the working folder of the data integration Developer, which were previously exported from the relational database repository. |
| Container | Create Version of a version controlled object | Detect child version controlled objects have changed in the relational database repository of the data integration tool since last saved/restored version. Synchronize changes done on the version controlled container and its child objects due to delete, rename and move operation with the remote centralized version control system repository. This can create new version of the version controlled objects which were changes in the relational database repository of the data integration tool due to rename/delete/move operation. Create new version of the version controlled child objects which are changed in the relational database repository after last saved/restored version by performing following steps. Export parent container object and its all child objects as XML artifacts from the relational database repository to local working folder of data integration developer Get the last version of the artifact from VCS while applying delta as well as before committing artifact to the VCS. Commit will fail if the last version of the artifact present in the VCS before applying delta |

TABLE 2-continued

| Object Type | Version Management Operation | Approach |
|---|---|---|
| | | is different than last version of the artifact present in the VCS before committing artifact to the VCS. If both versions of the artifact are same then perform implicit commit of the XML artifacts exported from the database Repository to the local version control system repository of the data integration Developer<br>Push XML artifact present in the local version control system repository to the remote centralized version control system repository<br>Implicit refresh/update of the XML artifact from the local version control system repository after pulling the latest XML Repository from the remote centralized version control system repository if new version of parent container object or any one of its child object is created by other data integration developer before committing checked out artifact<br>Create new version of the version controlled container object if it changed or any of its child object is modified/removed/renamed/moved in the relational database repository after last saved/restored version by performing above steps.<br>Update the version information of the objects in the database repository of the data integration tool |
| Container | Restoring object from one of its previous version | Pull version controlled XML artifact from the remote centralized version control system repository to the local version control system repository of the data integration Developer.<br>Import version controlled XML artifact from the local version control system repository to the local working directory of the data integration developer<br>Parse the XML artifact to get inputs on the version controlled child objects and their version number<br>Pull version controlled XML artifact corresponding to each of version controlled child object from the remote centralized version control system repository to the local version control system repository of the data integration Developer<br>Import version controlled XML artifact corresponding to each of version controlled child object from the local version control system repository to the local working folder of the data integration Developer<br>Provide mechanism to allow data integration Developer to restore an old version of the object using either With Merge or With No Merge option.<br>If data integration developers select restoring With No Merge option, then replace the object present in the database repository with object imported from XML artifact present in the local version control system repository and provide inputs on the missing references detected if any once the XML artifacts are imported as objects in the relational database repository of the data integration tool.<br>If data integration developers select restoring With Merge option, then give option to data integration developer to merge objects present in the relational database repository with the objects imported from the restored artifact.<br>Maintain the version information of the restored objects in the relational database repository of the data integration tool |
| Container | Restoring an object deleted in the database repository. | To recover an object deleted in the database repository, its first necessary to get the revision of the remote centralized version control system repository it last existed in. Considering this, embodiments of the present invention provide mechanism to data integration Developer to browse all the deleted artifacts present in a master branch of the remote centralized version control system repository configured with the data integration tool.<br>Data integration tool can provide filter to restrict the output to a list of artifacts having path entered by data integration Developer in the filter criteria. This can help data integration Developer to find version of the artifact deleted in the remote centralized version control system repository from which he wants to restore a version controlled object in the data integration tool.<br>Execute Copy operation provided by Version Control Systems to copy deleted XML artifact to the file system present in the remote centralized version control system |

TABLE 2-continued

| Object Type | Version Management Operation | Approach |
|---|---|---|
| | | repository once data integration Developer triggers restore option.<br>Pull version controlled XML artifact from the remote centralized version control system repository to the local version control system repository of the data integration Developer<br>Parse the XML artifact to get inputs on the version controlled child objects and their version number<br>Pull version controlled XML artifact corresponding to each of version controlled child object from the remote centralized version control system repository to the local version control system repository of the data integration Developer<br>Import version controlled XML artifact corresponding to each of version controlled child object from the local Version Control System Repository to the local working folder of the data integration Developer<br>Import version controlled XML artifacts from the local version control system repository to the local working folder of the data integration Developer.<br>Import the restored XML artifacts as objects in the relational database repository and provide inputs on missing references if any in the database repository after restoring XML artifact as object in the data integration tool<br>Maintain the version information of the restored object in the relational database repository of the Tool |

Managing Object Interdependencies and Synchronize a Data Integration Repository with a Version Control System Typically, version control systems can be used to coordinate and manage collaboration on integration projects. The integration projects developed using data integration tools often include many objects like mapping, model, data server etc. All these objects are stored in a relational database repository with dependencies between the objects. When a data integration tool is integrated with version control system, each of the first class objects is managed by the version control systems exclusively as individual files. The problem with this approach is that often there is a great deal of inter-file dependency for any particular object. The management of inter-file dependencies is usually not supported in version control systems. The responsibility of managing this dependency is left to the developer. This means that the developers need to be expert in the distributed version control system integrated with the data integration tool. Inter-dependencies of each of the object can be maintained while creating label/tag in the remote centralized version control system repository. A label (or tag) is a user supplied identification text that is used to identify a set of consistent objects versions (or the entire repository) in the Version Control System. A consistent set of object versions are the version controlled objects stored in the version control system repository from which a structurally and semantically valid relational database repository of the data integration tool can be populated. Label/tag can be used for deploying new repository, applying patching in production environment or create development branch in the version control system repository.

Embodiments of the present invention can find interdependencies of each of the object while creating a partial label/tag.

Get all the links or relationships of an object

For each link in links or relationships, get the parent, child or referenced object R Set the dependency relationship and save R as dependency Repeat step 1 on R recursively to get list of all dependent objects for an object As objects are inter-dependent in the relational database repository of the data integration tool, Consistency of the relationships between objects can only be guaranteed at the relational database repository level. Since first class objects are versioned individually without versioning dependent objects, the tip of the master branch of the remote centralized version control system repository may not represent a consistent/valid data integration metadata set. Options to synchronize the relational database repository of the data integration tool with the remote centralized version control system repository can be provided to bring a consistent set of objects from the relational database repository of the data integration tool to the remote centralized version control system repository. The relational database repository of the data integration tool can be synchronized with the remote centralized version control system repository while creating a full or partial label/tag from the configured master branch present in the remote centralized version control system repository. A label (or tag) is a user supplied identification text that is used to identify a set of consistent objects versions (or the entire repository) in the Version Control System. Label/tag can be used for deploying new repository, applying patching in production environment or create development branch in the version control system repository. Scope of synchronize while creating a partial label/tag is limited to object selected by data integration Developer and it's dependent objects calculated as described above while the objects present in the relational database repository of the data integration tool are synchronized with the remote central version control system repository while creating full creating a full label/tag in the remote centralized version control system repository.

Many data integration tools provide mechanism to delete, rename, cut and paste/drag and drop object. In embodiments of the present invention, changes done by a data integration developer on the object due to delete, rename and move operation can be maintained in the Version table in the relational database repository of the data integration tool. During sync process, renamed/deleted/moved child version controlled objects can be synchronized with the remote centralized Version Control System Repository. The following method can be used to sync database repository of data integration tool with the remote centralized version control system repository.

Figure 8:
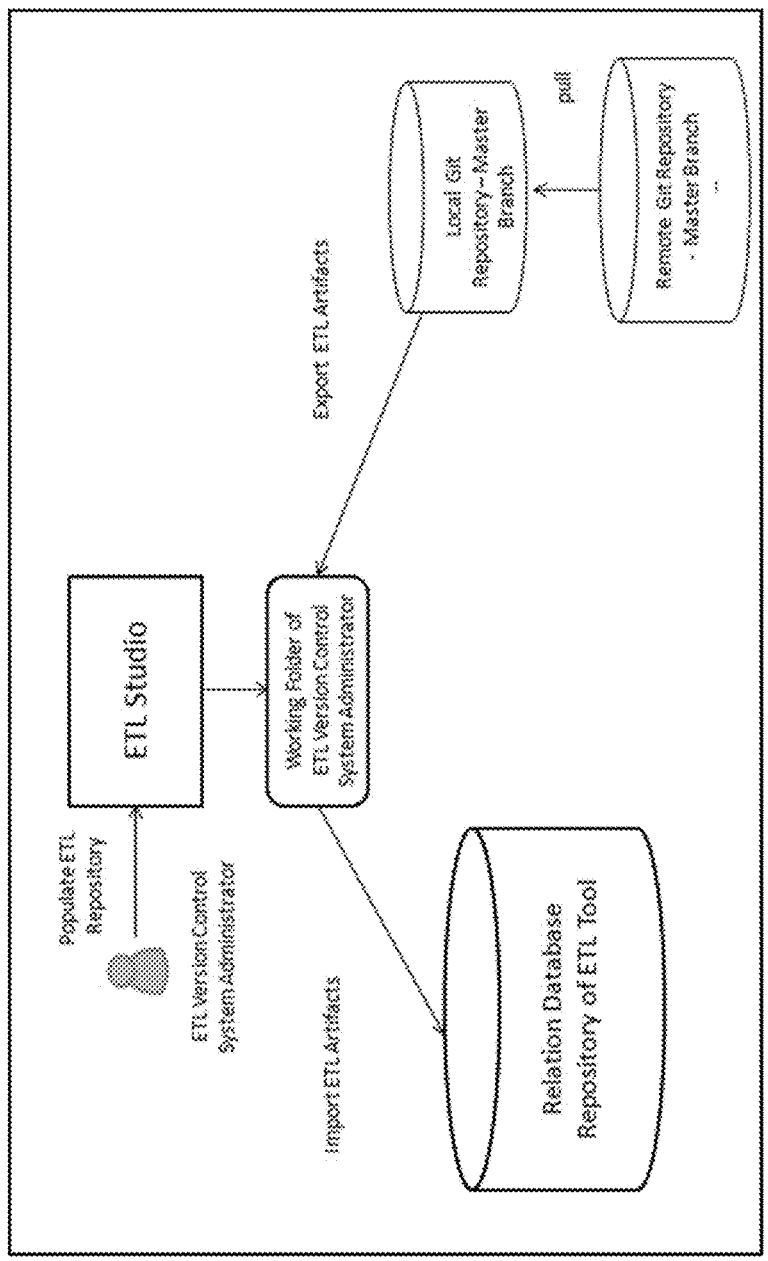
FIG. 8 illustrates a high level diagram of populating a data store based on artifacts maintained by a distributed version control system, in accordance with an embodiment of the present invention.

- Provide mechanism to lock the relational database repository of the data integration tool by maintaining lock flag in the relational database repository of the data integration tool before starting sync process.
- Disable all the version management operations so that no data integration Developer can perform version management operation when sync is in progress
- Provide mechanism to throw the exception when any of the transaction initiated for write operation is about to be committed to the relational database repository of the data integration tool
- Provide mechanism to throw the exception when any of the version management operation is called by data integration Developer when relational database repository is locked during sync process
- Find the list of version controlled container objects present in the Version table maintained in the relational database repository of the data integration tool. Execute following action for each of the container object
    - Detect version controlled child objects which are modified/renamed/moved/deleted in the relational database repository of the data integration tool.
    - Synchronize renamed/deleted/moved version controlled child objects with the remote centralized version control system repository which can also create new version of these objects.
    - Update version information in the Version Table for renamed/moved objects once they synced up with the remote centralized version control system repository
    - Remove rows present in the Version table corresponding to object marked as deleted once deleted objects are synced up with the remote centralized version control system repository
    - Create new version of remaining modified version controlled child objects. Update version information of child object in the Version table maintained in the relational database repository of the data integration tool
    - Create version of container object if any of the child is modified/deleted/moved/renamed or parent container object itself is modified/deleted/moved/renamed in the database repository. Update version information of container object in the Version table maintained in the relational database repository of the data integration tool
- Find all the non-version controlled objects present in the database repository of the data integration tool. Add all non-versioned objects to the local version control system repository and then push it to the remote centralized version control system repository. Add version information of the added objects to the remote centralized version control system repository in the Version table maintained in the relational database repository of the data integration tool.
- Disable all version management operations so that no data integration Developer can perform version management operation when sync is in progress FIG. 8 illustrates a high level diagram of populating a data store based on artifacts maintained by a distributed version control system, in accordance with an embodiment of the present invention. Embodiments of the present invention provide option to the data integration Version Control System Administrator to populate a database repository of the data integration tool from the XML artifacts present in the remote centralized version control system repository. This ensures that the set of artifacts in the remote centralized version control system repository are consistent and can be relied upon to recreate a structural consistent state of the relational database repository of the data integration tool.

A method of populating relational database repository of the data integration tool from the remote central version control system repository can include the following steps:

- Provide mechanism to the data integration Version Control System Administrator to initiate populate a newly created database repository of the data integration tool from the configured branch present in the remote centralized version control system repository.
- Pull the artifacts from the branch present in the remote central version control system repository to the local version control system repository
- Leverage export option provided by Version Control System to import artifacts present in the local version control system repository to the local working folder of the data integration Version Control System Administrator's machine.
- Import data integration XML artifacts as objects in the relational database repository of the data integration tool.
- Provide inputs on the imported artifacts, missing references if any to the data integration Version Control System Administrator once all the artifacts are imported to the data integration repository.
- Persist version metadata information of the imported objects into VERSION table present in the relational database repository of the data integration tool.
- Delete the XML artifacts present in the working folder of the data integration Developer, which were previously exported from the relational database repository.

It is possible that data integration development is going on for some time and at a later time Version Control System option is desired. In this example, an administrator can be provided with an option to configure a database repository of the data integration tool with an empty master branch present in the remote centralized version control system repository and add all the non-version controlled objects to the local and remote centralized version control system Repository for initial version creation once the configuration is done.

Embodiments of the present invention provide mechanism to restore a new relational database repository of the data integration tool from the database backup and then populate a restored ODI Repository from a trunk/branch configured with the VCS repository as described below.

- Restore a new data integration Repository from the database backup
- Provide mechanism to the data integration Version Control System Administrator to initiate populate a restored database repository of the data integration tool from the configured branch present in the remote centralized version control system repository.

Remove all the entries from SNP_VCS_VERSION table.

Pull the artifacts from the branch present in the remote central version control system repository to the local version control system repository Leverage export option provided by Version Control System to import artifacts present in the local version control system repository to the local working folder of the data integration Version Control System Administrator's machine.

Import data integration XML artifacts as objects in the relational database repository of the data integration tool.

If no object with GUID same as GUID present in the imported data integration XML artifact, then import corresponding data integration XML artifact as a new version controlled object in the data integration Repository Persist version metadata information of the imported data integration Objects in the VERSION table present in the data integration Repository.

Display the import report to the data integration VCS Administrator. The import report can give details on the imported objects, missing references detected after the import and the missing references fixed during the import.

Delete the XML artifacts present in the working folder of the data integration Developer, which were previously exported from the relational database repository.

Integrating object based data integration tools with distributed version control systems in a centralized environment, solving inter-file dependency issue and syncing the database repository of the data integration tool with the remote centralized version control system repository enables the data integration developer to try different modifications to the logic without having to worry about a negative impact to the previously developed logic leading to increased productivity and reduced time to market which helps enterprise to reduce total cost of ownership.

Similarly mechanism to populate a database repository from the artifacts present in the master branch of the remote centralized version control system repository, configuring a database repository of the data integration tool to an empty remote centralized version control system repository and creating a label/tag from the artifacts present in the remote centralized version control system repository enables data integration Version Control System Administrator to address multiple aspects of life cycle management of data integration tool by integrating data integration tool with an external distributed version control system.

Figure 9:
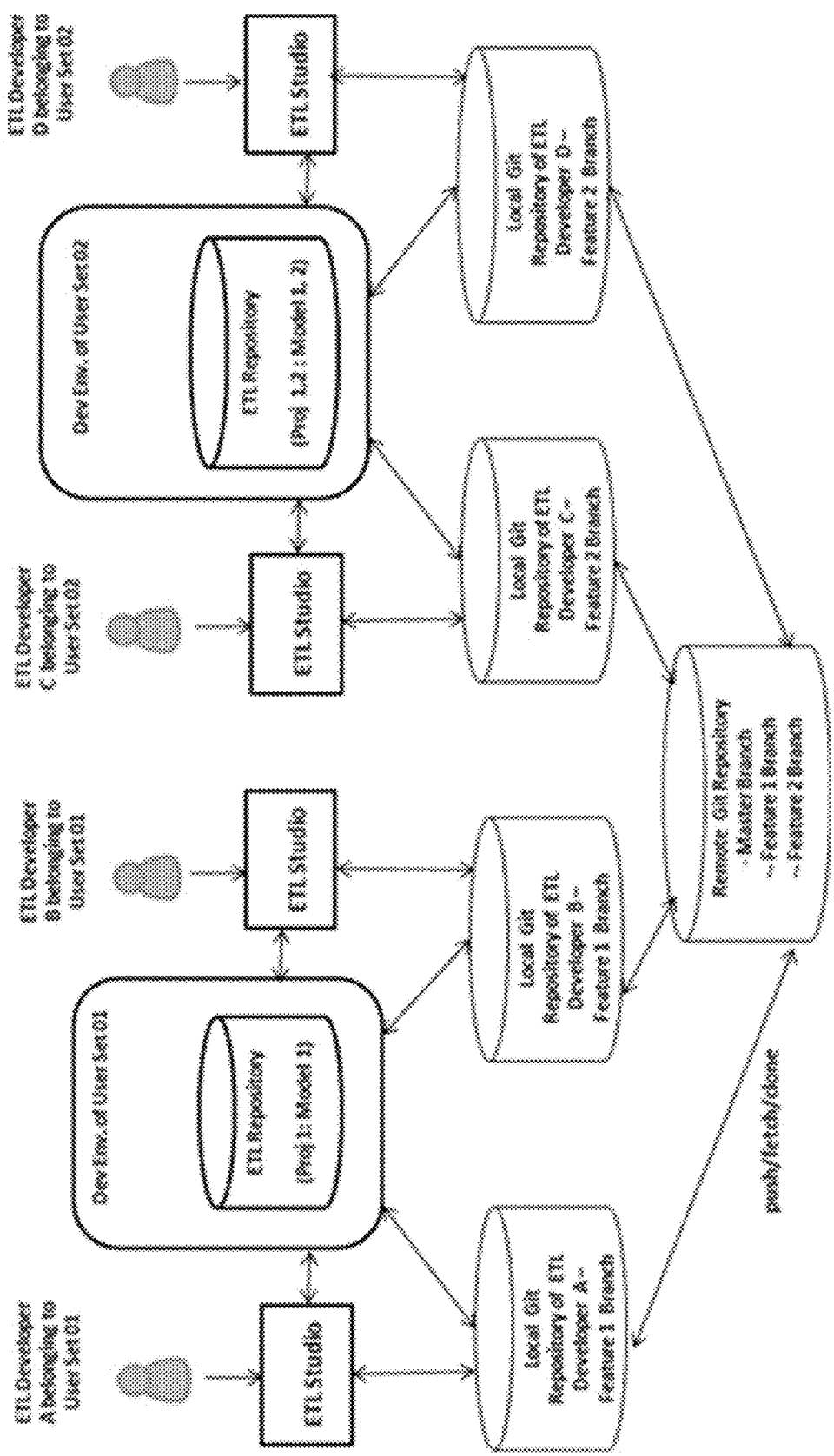
FIG. 9 illustrates a block diagram of a data integration system in a distributed development environment integrated with a distributed version control system, in accordance with an embodiment of the present invention.

FIG. 9 illustrates a block diagram of a data integration system in a distributed development environment integrated with a distributed version control system, in accordance with an embodiment of the present invention. In development of a large integration project, developers are typically located at several geographically distributed locations. Each location develops one or more modules of a large integration project. Locations may be situated near one another and connected by a high speed network, or they may be distributed across multiple continents and have poor network connectivity or no network connectivity. Parallel development is more difficult in a geographically distributed environment. Time zone differences, language barriers, network access and other problems complicate communication and coordination among team members.

Many data integration tools are providing access to a centralized, shared repository across a network to data integration developers working across multiple locations. This approach has significant issues like vulnerability to network problems due to the need to access the central repository:

Unacceptable performance speed due to frequent accesses to the central repository over a relatively low bandwidth and high network latency Network and scaling problems for systems having large numbers of users requiring remote access to a central repository.

The load on the central server increases with the number of users in the network In view of these issues faced by data integration developers in a distributed environment, embodiments of the present invention can utilize a distributed version control systems to coordinate integration project activities in scenarios such as this. As described further below, each of the distributed teams can be working on the separate database repository mapped to the feature/development branch present in the remote centralized version control system repository as shown in FIG. 9. Each of the distributed teams can work with their respective database repository and development branch present in the remote centralized version control system repository as shown below. Each of the distributed team can perform all version management operations like create new versions of a version controlled object, add a non-version controlled object to the Version Control System Repository, restore a version controlled object from one of its previous version etc. from the configured development branch present in the remote centralized version control system repository.

Once development teams are done with development; they can merge development branches with the master branch present in the remote centralized version control system repository as and when decided by project team. Branch merge is a serious operation and could result in many conflicts. These conflicts can be resolved by individual owners over a period of time (could be several days). In some embodiments, an administrator can initiate the branch merge operation and the database repository of the data integration tool can go into a merge phase. It is not feasible to use merging feature provided by Version Control System as most of the data integration tools rely on object based persistence. The following method may be used to merge development branches:

A data integration Version Control System Administrator can initiate the branch merge operation and the database repository of data integration tool can go into a merge phase. The metadata information of branch merge operation can be maintained in the Merge table in the relation database repository of the data integration tool from where branch merge is initiated Information of every object that are part of the merge, can be added to the Merge Object table which can be used as a source for knowing what objects have been merged and which of these have conflicts that need to be resolved.

After the branch merge has been initiated and the objects that have merge conflicts identified, developers can find objects for which they are responsible that have merge conflicts outstanding. An data integration Developer can work to resolve a merge conflict regardless to if it is assigned to them or not. To perform the merge, an option can be provided to compare two version of the object—branch version with the repository object. This can help the data integration Developer to determine which of the two has more "differences" that are needed. The object with more differences can be used as starting point for doing the merge. data integration Developer can be using editor provided by data integration tool to resolve conflict.

Update the status of the Merge object table present in the relation database repository of the data integration tool once conflict is resolved. Even new version of object after resolving conflict can be added to the remote centralized version control system repository.

Update the status of the Merge table once merge operation is complete. In some embodiments the merge can be recorded in the remote central version control system repository so that merge information can be retried while showing version tree of the object to the data integration Developer.

Figure 10:
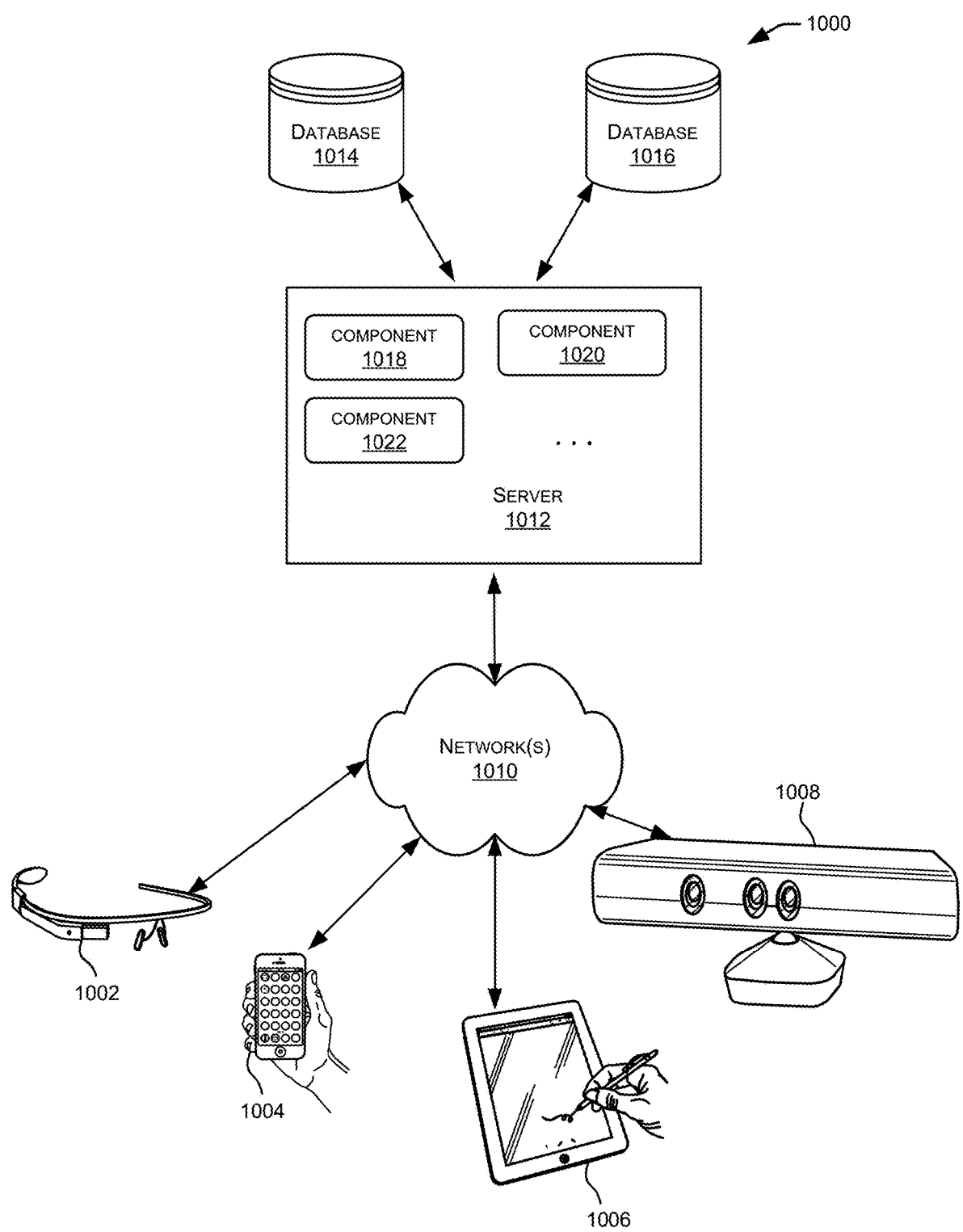
FIG. 10 depicts a simplified diagram of a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
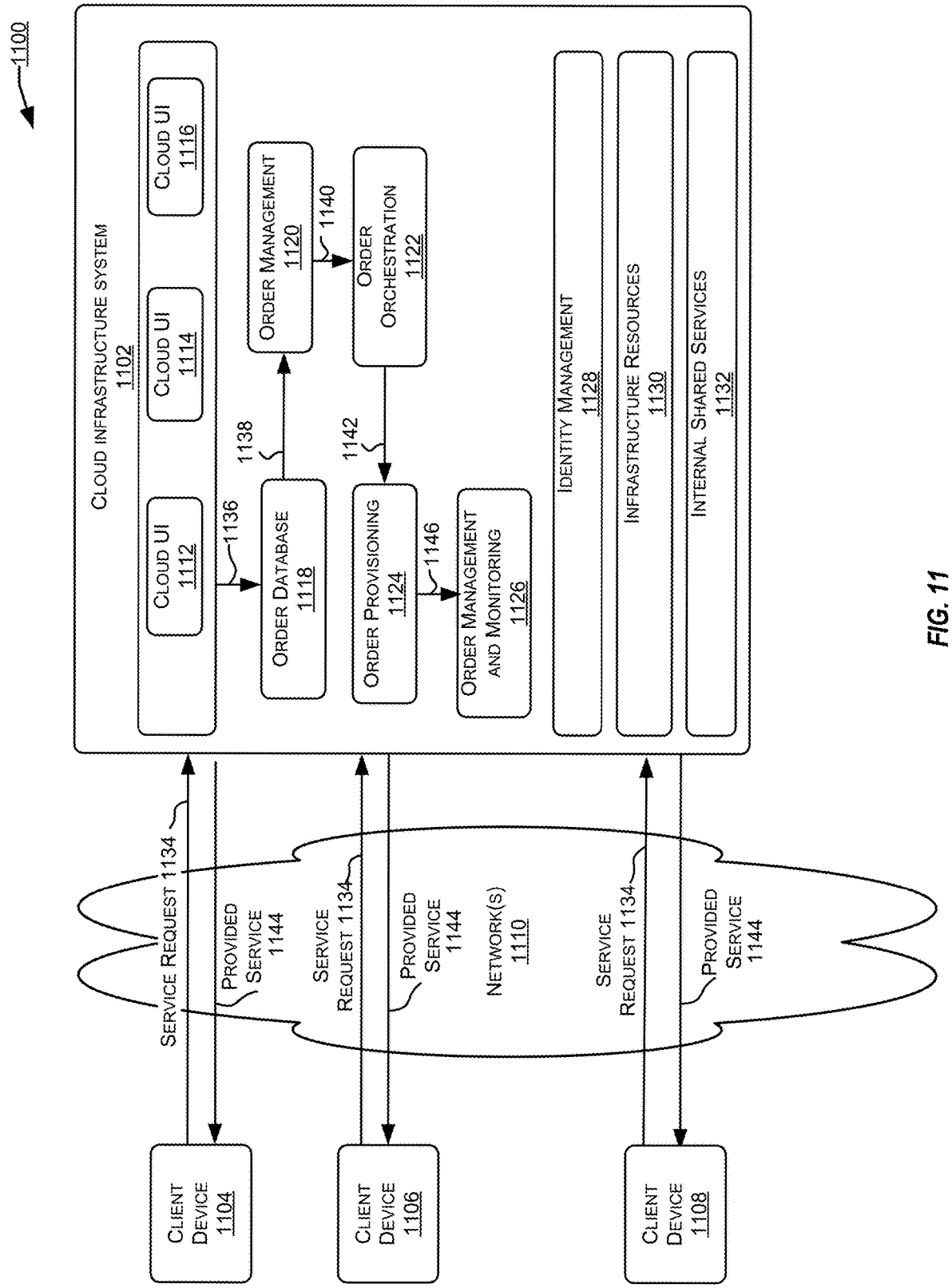
FIG. 11 is a simplified block diagram of components of a system environment by which services provided by the components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
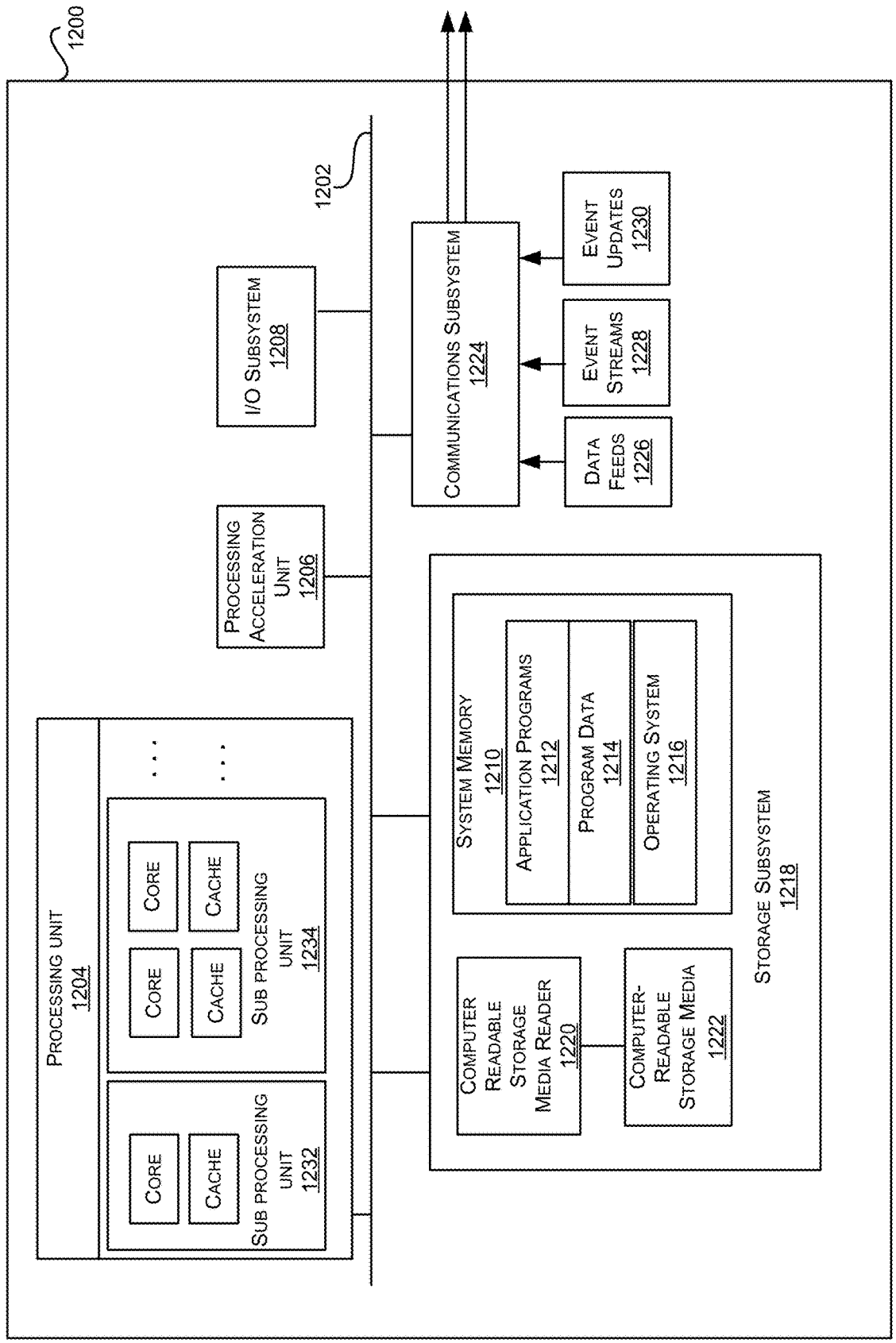
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art can appreciate other ways and/or methods to implement the various embodiments.

The operations performed by the system of FIG. 1 have been described above in conjunction with the block diagrams and operational diagrams of the drawings. The flow diagrams (also referred to as flowcharts) of FIGS. 13-24 will further describe the operations of the system with respect to Centralized VCS and Distributed VCS environments.

Figure 13:
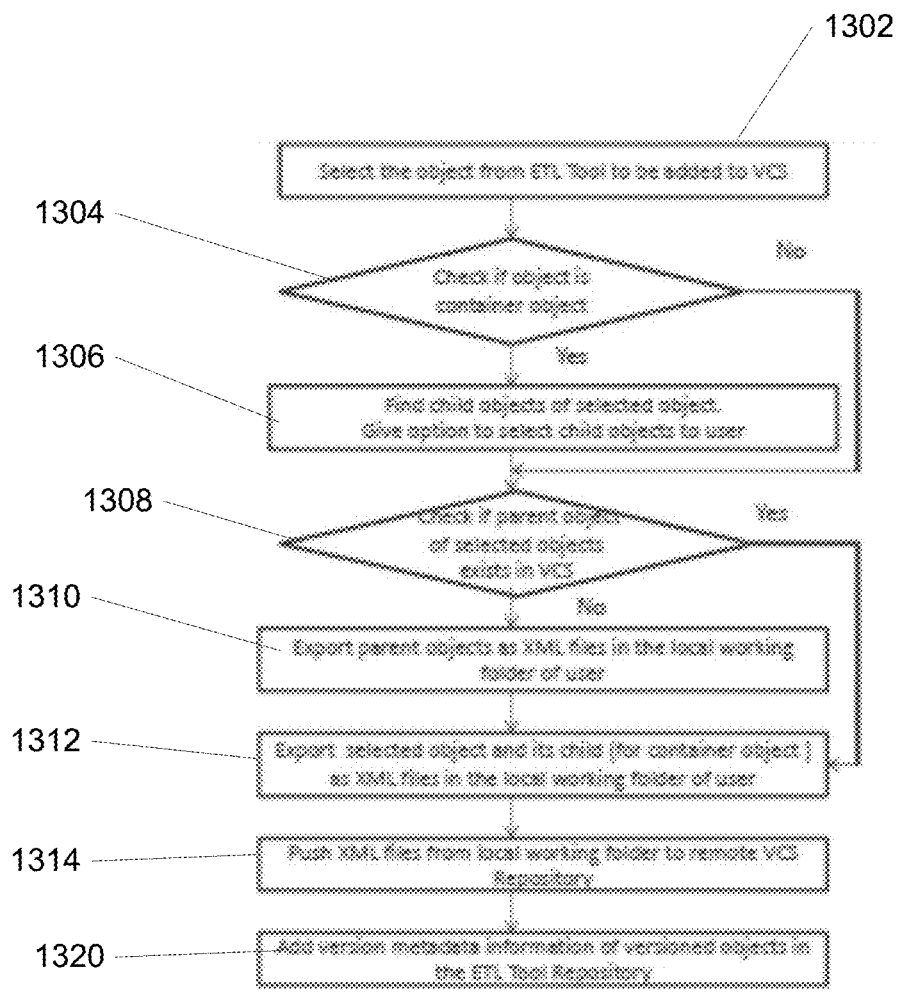
FIG. 13 illustrates a flow diagram of operations performed by the system to add an ETL object to a Centralized VCS.

FIG. 13 illustrates a flow diagram of operations performed by the system to add an ETL object to a Centralized VCS. In the first operation, at the box 1302, a developer using the ETL Tool selects the object to be added to the VCS. At the decision box 1304, the system checks to determine if the selected object is a container object. If the determination is affirmative, a "YES" outcome, then at box 1306, the system finds child objects of the selected object, and provides an interface by which the developer user may select child objects, as desired. If the selected object is not a container object, a negative (NO) outcome at the decision box, then the system skips the operation at 1306 and proceeds directly to the decision box 1308, where the system determines if a parent object of the selected objects exists in the VCS. If the outcome at the decision box 1308 is negative, then the system proceeds to box 1310 where the system exports parent objects as XML files in the local working folder of the user and then proceeds to box 1312, where the system exports the selected object and its child object (for the container object) as XML files in the local working folder of the developer user. The system operation directly reaches the export box 1312 if the outcome at the decision box 1308 is affirmative (YES). After the export box 1312 operation is performed, the operation proceeds to box 1314, where the system pushes XML files from the user local working folder to a remote VCS Repository. The remote VCS Repository is accessible by the system over a network connection. After the XML push operation of box 1314, the system operation performs box 1320, where the system adds version metadata information of the versioned objects in the ETL Tool Repository.

Figure 14:
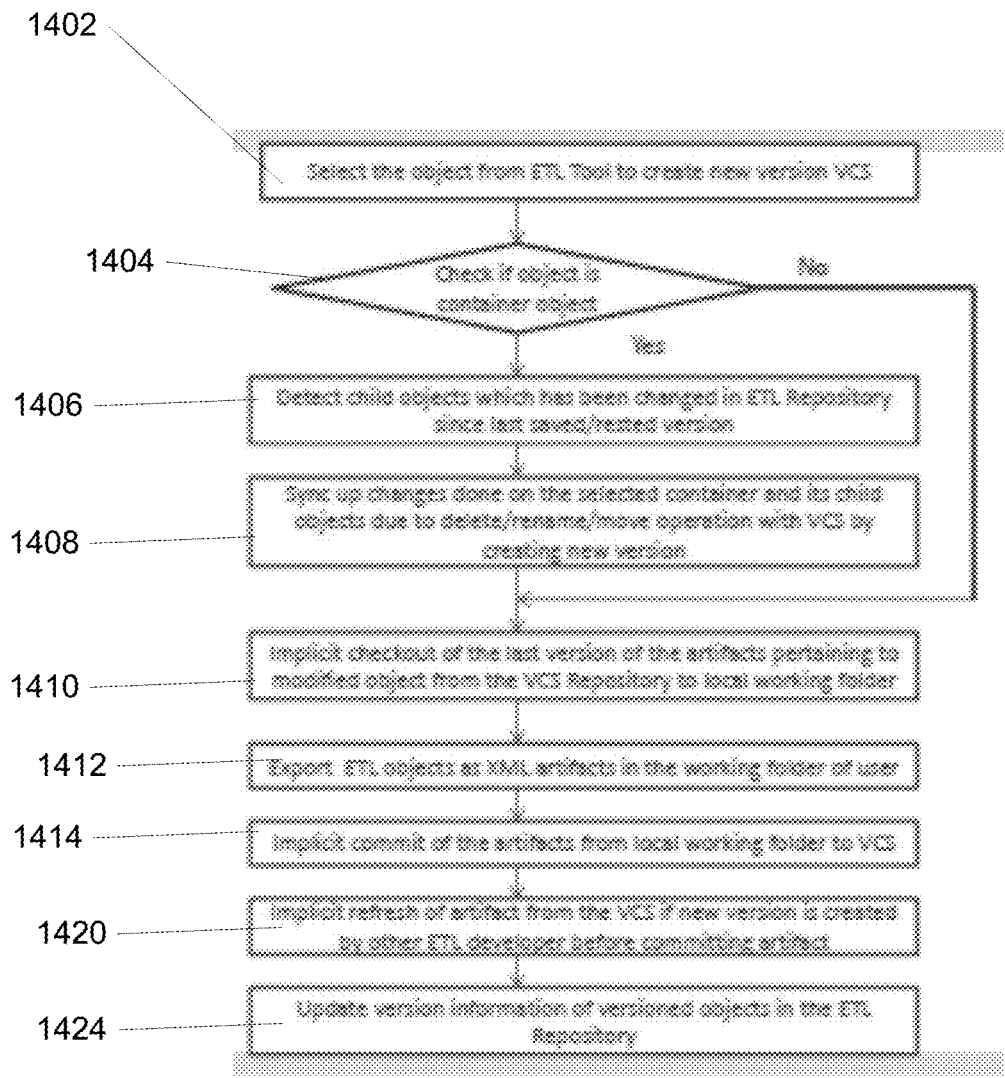
FIG. 14 illustrates a flow diagram of operations performed by the system to create a version of an ETL Object when the ETL tool of the system is integrated with a Centralized VCS.

FIG. 14 illustrates a flow diagram of operations performed by the system to create a version of an ETL Object when the ETL tool of the system is integrated with a Centralized VCS. In the first operation of FIG. 14, at the box 1402, the user developer selects the ETL object with the ETL Tool to create a new version VCS. The system determines if the object is a container object at the decision box 1404. If the outcome of the decision box 1404 is affirmative, YES, then system operation proceeds to the box 1406, where the system detects child objects that have been changed in the ETL Repository since the last saved or "rested" version. Operation then proceeds to the box 1408, where the system synchronizes changes performed on the selected container and its child objects due to any delete, rename, or move operation with the VCS by creating a new version. The system operation then proceeds to the box 1410, where the system performs an implicit checkout of the last version of the artifacts pertaining to the modified object from the VCS Repository to the local working folder of the user developer. If the outcome of the decision box 1404 is negative, NO, then the system operation proceeds directly from the decision box 1404 to the implicit check out box 1410. Next, operation resumes with the box 1412, where the system exports ETL objects as XML artifacts in the working folder of the user developer. Next, at the box 1414, the system performs an implicit commit of the artifacts from the local working folder to the VCS. At the box 1420, the system performs an implicit refresh of artifacts from the VCS, if a new version is created by another ETL developer, before committing the artifact from the local working folder to the VCS. Lastly, at the box 1424, the system performs an update of version information of the versioned objects in the ETL repository.

Figure 15:
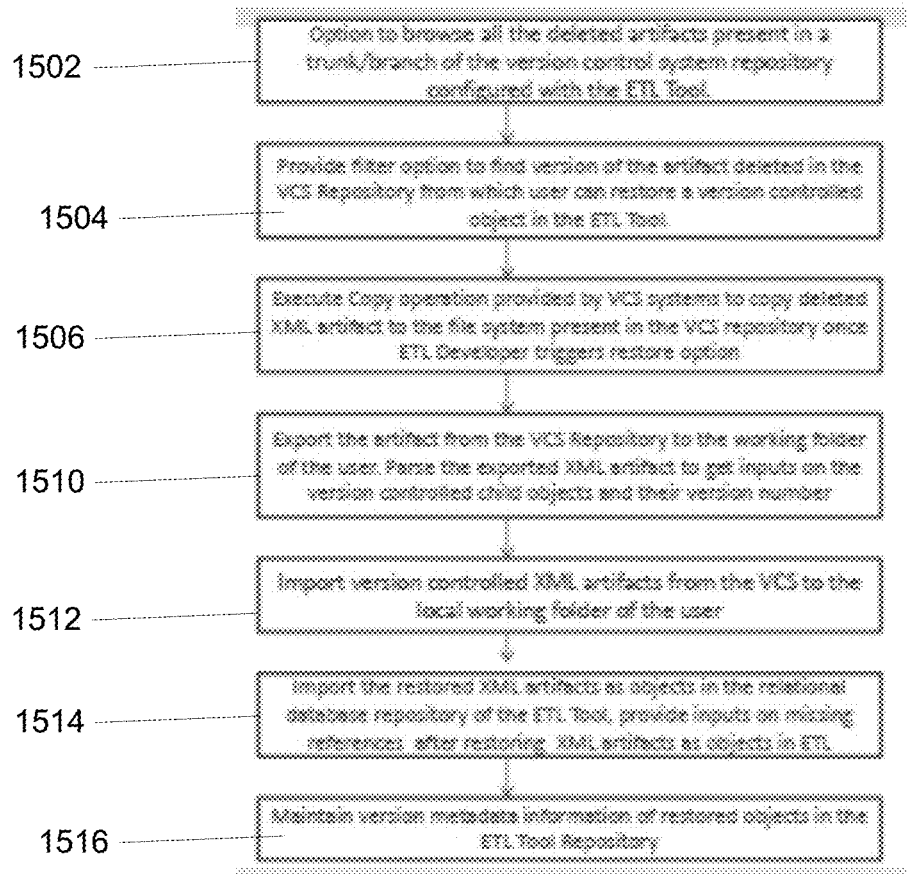
FIG. 15 illustrates a flow diagram of operations performed by the system to restore a deleted ETL Object from a Centralized VCS.

FIG. 15 illustrates a flow diagram of operations performed by the system to restore a deleted ETL Object from a Centralized VCS. In the first operation of FIG. 15, at box 1502, the system provides an option to the user to browse all the deleted artifacts present in a trunk or branch of the VCS Repository configured with the ETL Tool. Next, at the box 1504, the system provides a filter option to find a version of the artifact that has been deleted in the VCS Repository, from which the user can restore a version-controlled object with the ETL Tool. At the next operation, at box 1506, the system executes a copy operation provided by the VCS system to copy the deleted XML artifact to the file system present in the VCS Repository, in response to the ETL Developer selecting a restore option. At the box 1510, the system next exports the artifact from the VCS Repository to the working folder of the user, and parses the exported XML artifact to get inputs on the version-controlled child objects and their respective version numbers. At box 1512, the system imports version-controlled XML artifacts from the VCS to the local working folder of the user developer. Next, at the box 1514, the system imports the restored XML artifacts as objects in the relational database repository of the ETL Tool, and provides inputs on the missing references after restoring XML artifacts as objects in the ETL Lastly, at the box 1516, the system maintains version metadata information of restored objects in the ETL Tool Repository of the user developer.

Figure 16:
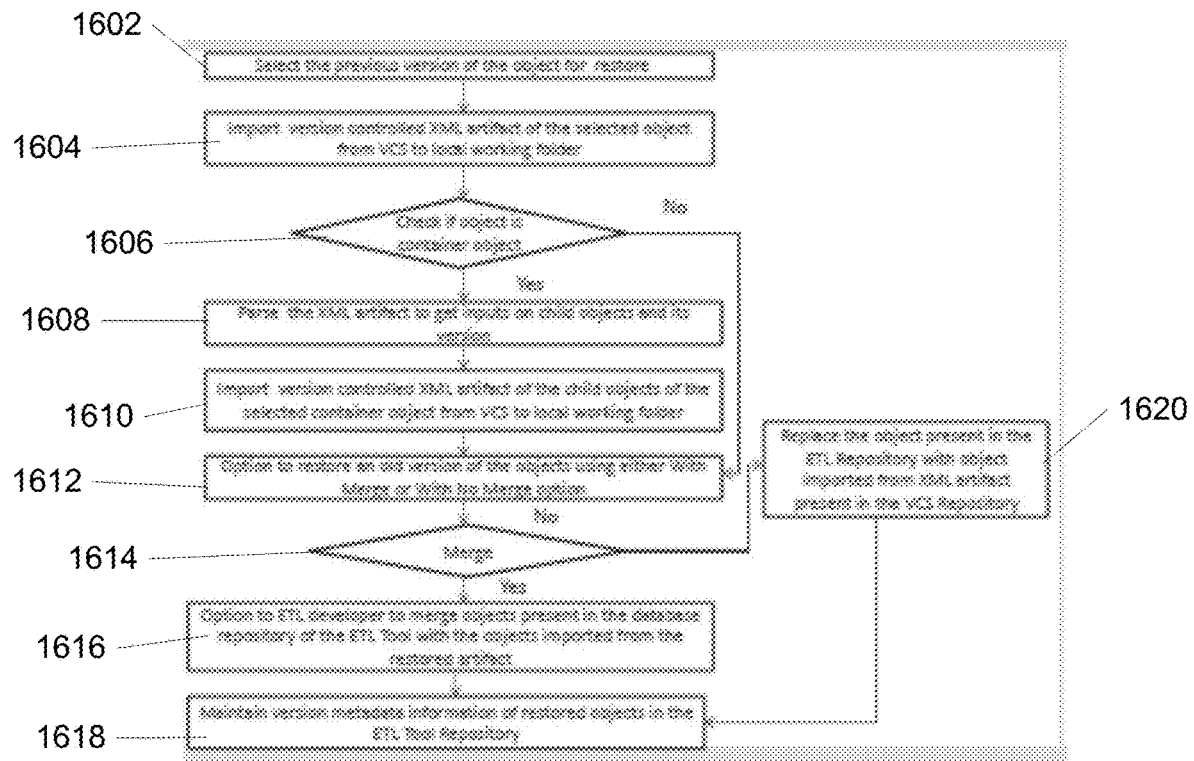
FIG. 16 illustrates a flow diagram of operations performed by the system to restore an ETL Object from a previous version when the ETL Tool is integrated with a Centralized VCS.

FIG. 16 illustrates a flow diagram of operations performed by the system to restore an ETL Object from a previous version when the ETL Tool is integrated with a Centralized VCS. The first operation of FIG. 16, at the box 1602, is for the system to select the previous version of the object for the restore operation. Next, at box 1604, the system imports a version-controlled XML artifact of the selected object from the VCS to the local working folder. At the decision box 1606, the system checks to determine if the object is a container object. If the outcome is affirmative, the object is a container object, then operation proceeds to box 1608, where the system parses the XML artifact to get inputs on child objects and the version of the XML artifact. At box 1610, the system next imports a version-controlled XML artifact of each of the child objects of the selected container object from the VCS to the local working folder. The next operation, at box 1612, is for the system to provide a user-selectable option to restore an old version of the objects using either a "With Merge" or "With No Merge" option. The system operation reaches the "merge option" box 1612 directly from the decision box 1606 if the outcome at the decision box 1606 is negative, meaning the object is not a container object. Next, after the "merge option" box 1612, the system operation reaches the decision box 1614, where the system awaits instruction from the user as to performing a merge operation. If the user instruction at box 1614 is affirmative, perform a merge operation, then the system performs a merge operation and then at the box 1616, the system provides an option to the ETL user developer to merge objects present in the database repository of the ETL Tool with the objects imported from the restored XML artifact. Next, at the box 1618, the system performs operations to maintain version metadata information of restored objects in the ETL Tool Repository. If the outcome at the decision box 1614 is negative, do not perform a merge operation, then the system performs the operation of box 1620, to replace the object present in the ETL Repository with an object imported from the XML artifact present in the VCS Repository.

Figure 17:
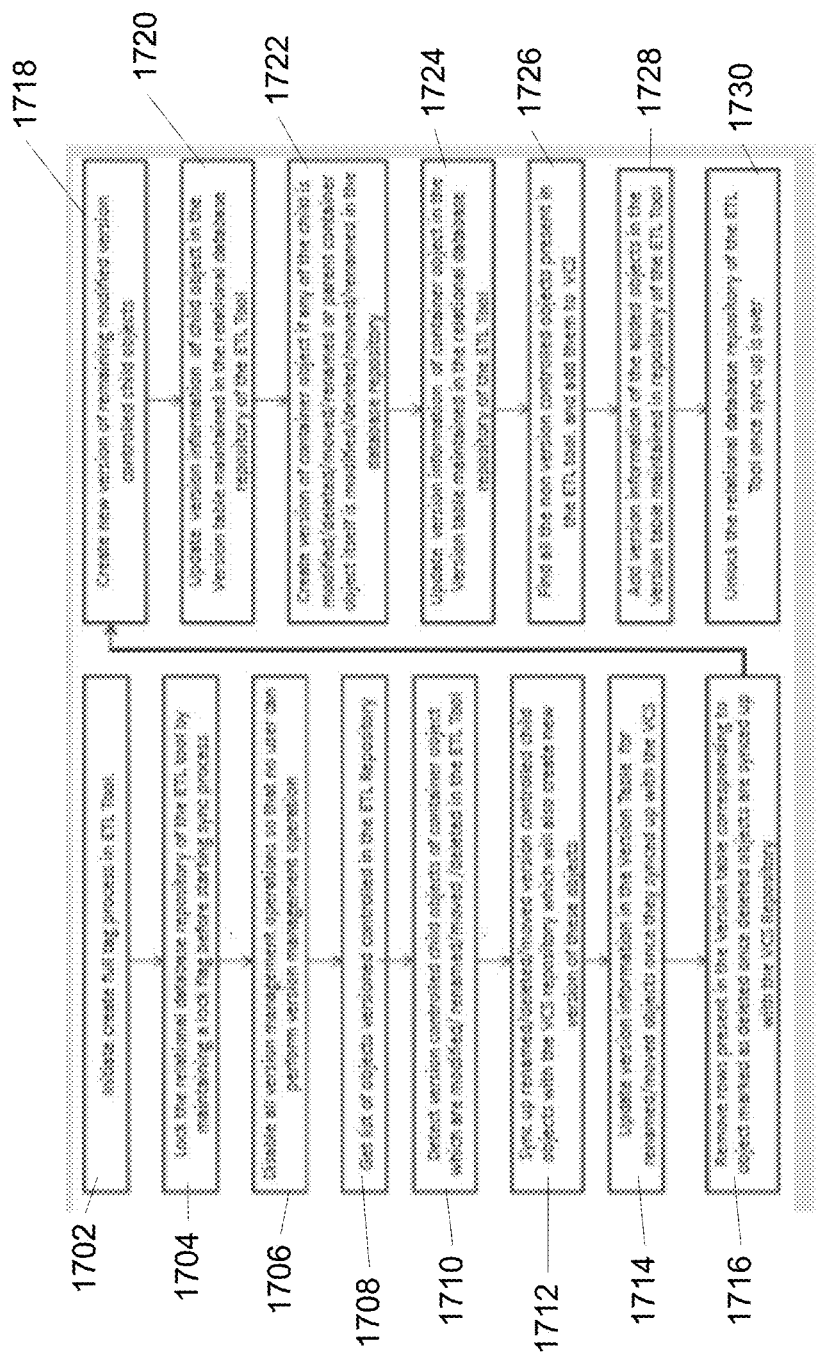
FIG. 17 illustrates a flow diagram of operations performed by the system to fully synchronize an ETL repository with a VCS repository when the ETL Tool is integrated with a Centralized VCS.

FIG. 17 illustrates a flow diagram of operations performed by the system to fully synchronize an ETL Repository with a VCS Repository when the ETL Tool is integrated with a Centralized VCS. In the first full sync operation, at box 1702 of FIG. 17, the system initiates the creation of a full tag process in the ETL Tool. A label (or tag) is a user-supplied identification text that is used to identify a set of consistent object versions (or the entire data repository) in a VCS. A full tag (or label) is created using all the integration artifacts present in the repository, while a partial tag (or label) is created from selected artifacts present in the repository, along with its dependent artifacts. At the next operation, at box 1704, the system locks the relational database repository of the ETL tool by maintaining a lock flag before starting the full sync process. At the box 1706, the system disables all version management operations so that no user can perform a version management operation during the full sync operation. The system next, at box 1708, obtains a list of objects that are versioned-controlled in the ETL Repository. At the box 1710, the system detects version-controlled child objects of the container object that have been renamed, moved, or deleted in the ETL Tool. At the next box, the box 1712, the system synchronizes the modified-renamed-deleted-moved version-controlled child objects with the VCS repository, to which the system will respond by creating a new version of these objects. At the box 1714, the system updates version information in the Version Table for the renamed/moved objects once they have been synced up with the VCS Repository. Next, at box 1716, the system removes rows present in the Version Table corresponding to any object marked as deleted once the deleted objects are synced up with the VCS Repository. At the box 1718, the system creates a new version of remaining modified version-controlled child objects. Next, at the box 1720, the system updates version information of any child object in the Version Table maintained in the relational database repository of the ETL Tool. At the box 1722, the system next creates a version of a container object if any of component of the child object is modified, deleted, moved, or renamed, or if the parent container object itself has been modified, deleted, moved, or renamed in the database repository. Next, at the box 1724, the system updates version information of any container object in the Version Table maintained in the relational database repository of the ETL Tool. At the box 1726, the system next finds all the non-version-controlled objects present in the ETL Tool. and adds them to the VCS Repository. At box 1728, the system adds version information of the added objects in the Version Table maintained in the repository of the ETL Tool. Lastly, at box 1730, the system unlocks the relational database repository of the ETL Tool once the full sync up process is completed.

Figure 18:
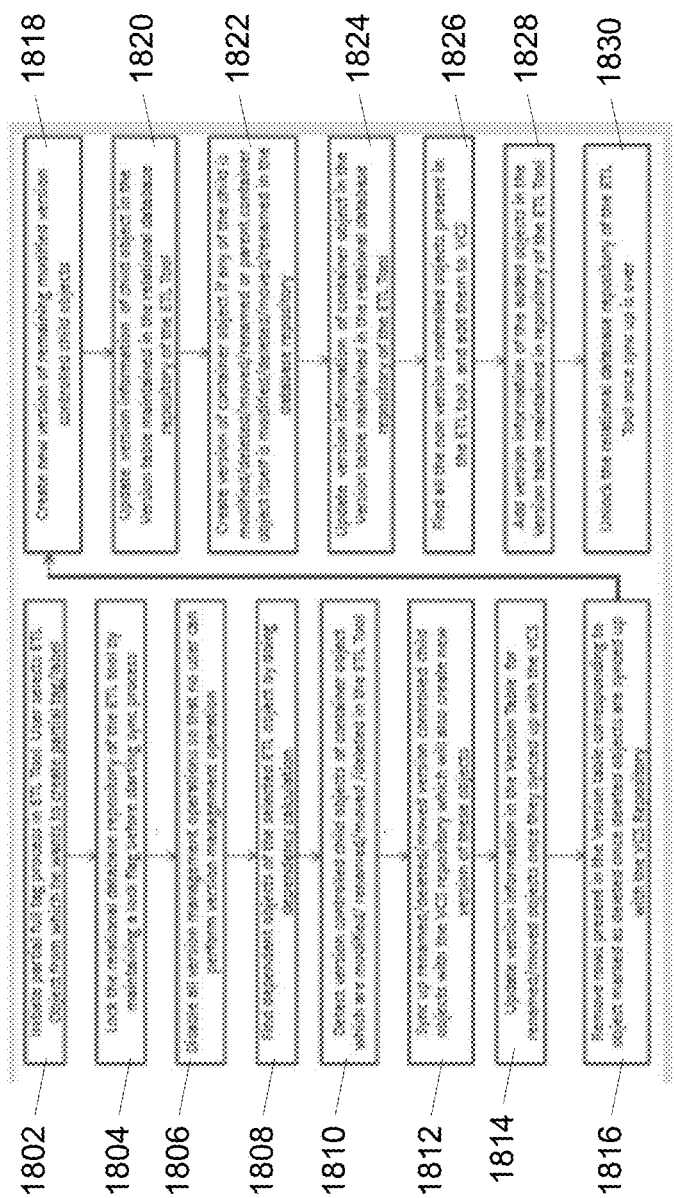
FIG. 18 illustrates a flow diagram of operations performed by the system to partially synchronize an ETL repository with a VCS repository when the ETL Tool is integrated with a Centralized VCS.

FIG. 18 illustrates a flow diagram of operations performed by the system to partially synchronize an ETL repository with a VCS repository when the ETL Tool is integrated with a Centralized VCS. In the first operation of FIG. 18, at box 1802, the system initiates a partial full tag process in ETL Tool. A full tag (or label) is created using all the integration artifacts present in the repository, while a partial tag (or label) is created from selected artifacts present in the repository, along with its dependent artifacts. In the box 1802 operation, the user selects an ETL Object from which the user wants to create a partial tag or label. At the box 1804, the system locks the relational database repository of the ETL tool by maintaining a lock flag before starting the partial sync process. Next, at the box 1806, the system disables all version management operations so that no user can perform version management operations during the partial sync process. At the box 1808, the system finds dependent objects of the selected ETL object by doing dependency calculations, as will be known by those skilled in the art. Next, at box 1810, the system detects version-controlled child objects of any container objects that are modified, renamed, moved, or deleted in the ETL Tool. At the box 1812, the system performs a synchronization of the renamed, deleted, or moved version-controlled child objects with the VCS Repository, an operation in response to which the system will also create new version of these objects. Next, at the box 1814, the system will update version information in the Version Table for renamed or moved objects, after such objects have been synced up with the VCS Repository. At the box 1816, the system removes rows present in the Version Table that correspond to any object marked as deleted, after the deleted objects are synced up with the VCS Repository. At the box 1818, the system next creates a new version of any remaining modified version-controlled child objects. The next operation, at box 1820, is an operation in which the system updates version information of child objects in the Version Table as maintained in the relational database repository of the ETL Tool. At box 1822, the system creates a version of a container object if any of the child objects have been modified, deleted, moved, or renamed, or if the parent container object itself is modified, deleted, moved, or renamed in the database repository. Next, at box 1824, the system updates version information of any container object in the Version Table that is maintained in the relational database repository of the ETL Tool. At box 1826, the system next finds all the non-version-controlled objects present in the ETL Tool and adds them to the VCS Repository. Next, at box 1828, the system adds version information of the added objects in the Version Table as maintained in the repository of the ETL Tool. Lastly, at box 1830, the system unlocks the relational database repository of the ETL Tool after the partial sync up operation has been completed.

Figure 19:
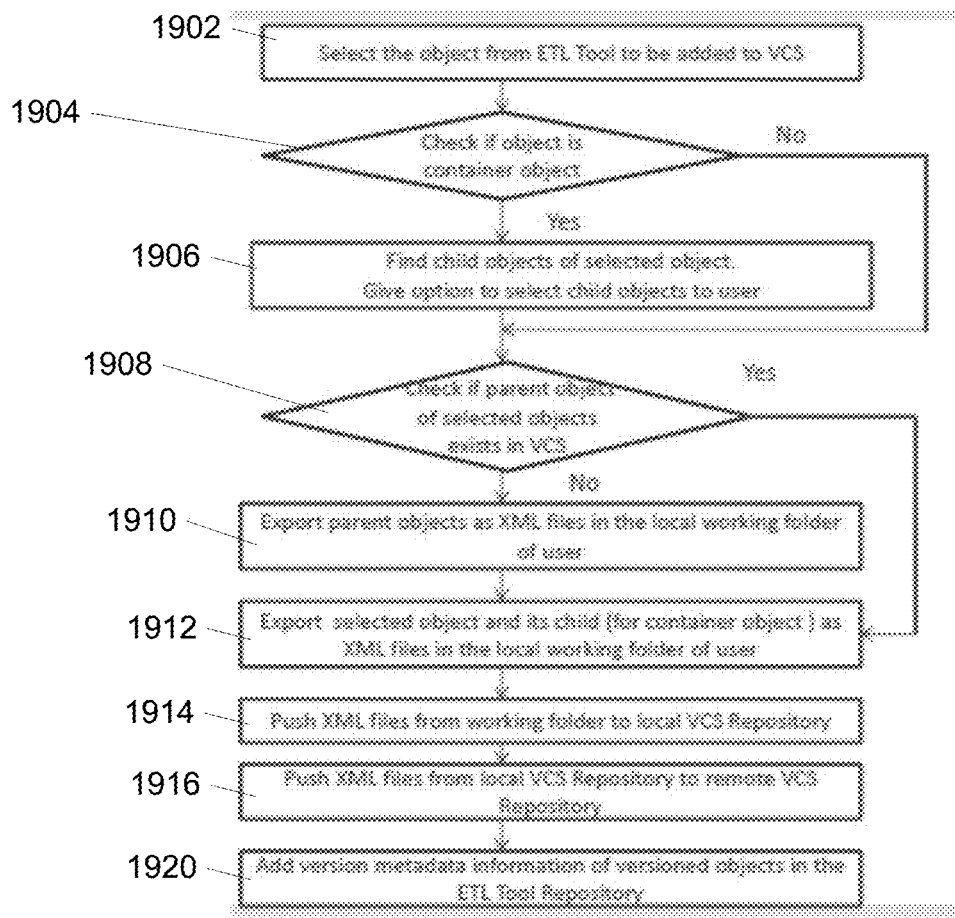
FIG. 19 illustrates a flow diagram of operations performed by the system to add an ETL object to a Distributed VCS.

FIG. 19 illustrates a flow diagram of operations performed by the system to add an ETL object to a Distributed VCS. In the first operation, at the box 1902, a developer using the ETL Tool selects the object to be added to the VCS. At the decision box 1904, the system checks to determine if the selected object is a container object. If the determination is affirmative, a "YES" outcome, then at the box 1906, the system finds child objects of the selected object, and provides an interface by which the developer user may select child objects, as desired. If the selected object is not a container object, a negative (NO) outcome at the decision box, then the system skips the operation at the box 1906 and proceeds directly to the decision box 1908, where the system determines if a parent object of the selected objects exists in the VCS. If the outcome at the decision box 1908 is negative, then the system proceeds to the box 1910 where the system exports parent objects as XML files in the local working folder of the user and then proceeds to the box 1912, where the system exports the selected object and its child object (for the container object) as XML files in the local working folder of the developer user. The system operation directly reaches the export box 1912 if the outcome at the decision box 1908 is affirmative (YES). After the export box 1912 operation is performed, the operation proceeds to the box 1914, where the system pushes XML files from the user local working folder to a VCS Repository that is local to the user. The local VCS Repository is accessible by the user at a local location, such as a direct connection to the computer device being used by the user to access the system. After the XML push operation of the box 1914, the system operation proceeds to the box 1916, where the system pushes XML files from the user local VCS Repository to a remote VCS Repository. The user can access the remote VCS Repository by the system over a network connection. After the XML push operation of the box 1916, the system operation performs the process of box 1920, where the system adds version metadata information of the versioned objects in the ETL Tool Repository.

Figure 20:
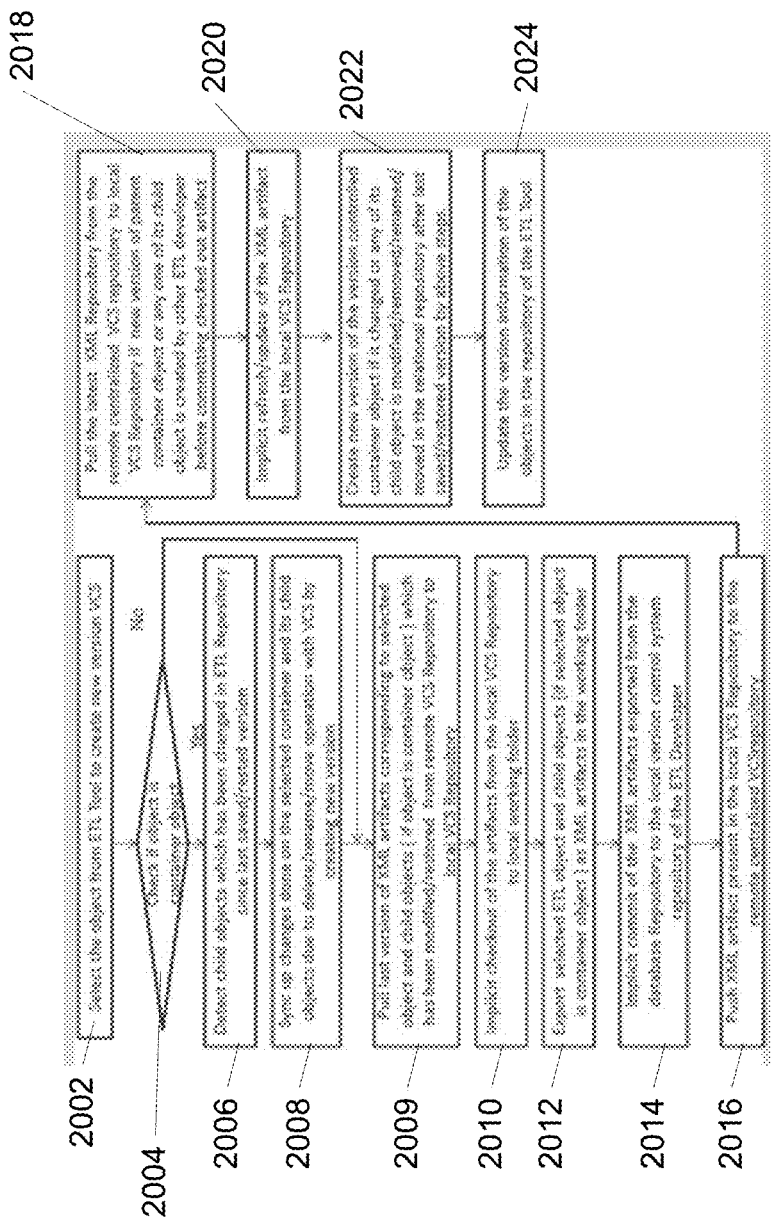
FIG. 20 illustrates a flow diagram of operations performed by the system to create a version of an ETL Object when the ETL tool of the system is integrated with a Distributed VCS.

FIG. 20 illustrates a flow diagram of operations performed by the system to create a version of an ETL Object when the ETL tool of the system is integrated with a Distributed VCS. In the first operation of FIG. 20, at the box 2002, the user developer selects the ETL object with the ETL Tool to create a new version VCS. The system determines if the object is a container object at the decision box 2004. If the outcome of the decision box 2004 is affirmative, YES, then system operation proceeds to the box 2006, where the system detects child objects that have been changed in the ETL Repository since the last saved or "rested" version. Operation then proceeds to the box 2008, where the system synchronizes changes performed on the selected container and its child objects due to any delete, rename, or move operation with the VCS by creating a new version. The system operation then proceeds to the box 2009, where the system pulls the last version of XML artifacts corresponding to the selected object and corresponding child objects (if the selected object is a container object) that have been modified or restored from the remote VCS Repository to the user local VCS Repository. If the outcome of the decision box 2004 was negative, NO, then the system operation proceeds directly from the decision box 2004 to the "pull last version of XML artifacts" box 2009. After the "pull last version" box 2009, the system operation proceeds to box 2010, where the system performs an implicit checkout of the last version of the artifacts pertaining to the modified object from the VCS Repository to the local working folder of the user developer. Next, operation resumes with the box 2012, where the system exports the selected object and corresponding child objects (if the selected object is a container object) as XML artifacts in the working folder of the user developer. Next, at the box 2014, the system performs an implicit commit of the XML artifacts exported from the database (remote) VCS Repository to the local VCS Repository of the user developer. At the box 2016, the system next pushes XML artifacts present in the local VCS Repository to the remote centralized VCS Repository. Next, at the box 2018, the system pulls the latest XML Repository from the remote centralized VCS Repository to the local VCS Repository, if a new version of the parent container object or of any one of its child objects is created by another ETL user developer before committing the checked out artifact. At the box 2020, the system performs an implicit refresh or update of the XML artifacts from the local VCS Repository. Next, at the box 2022, the system creates a new version of the version-controlled container object if the container object changed or if any of its child objects have been modified, removed, or renamed, or moved in the relational repository after the last saved or restored version by the above steps. Lastly, at the box 2024, the system performs an update of the version information of the versioned objects in the ETL tool repository.

Figure 21:
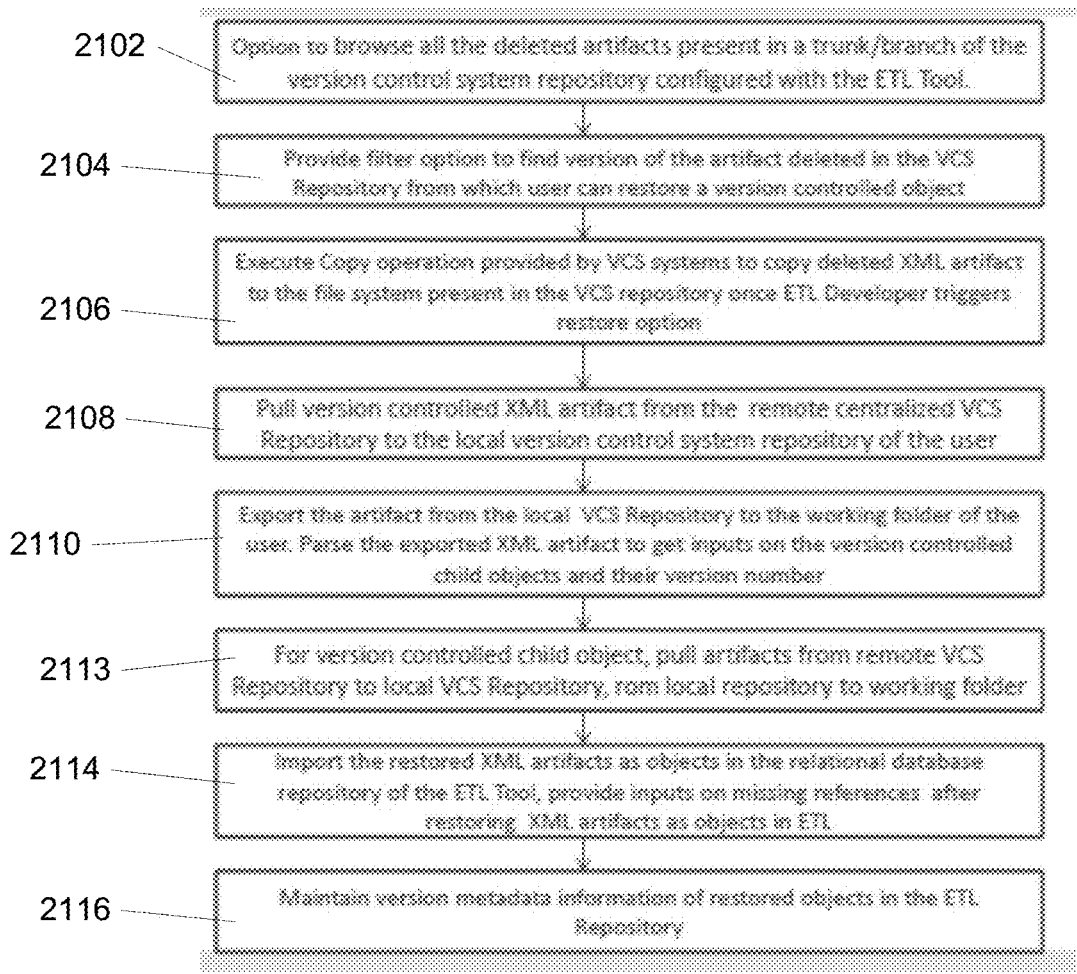
FIG. 21 illustrates a flow diagram of operations performed by the system to restore a deleted ETL Object from a Distributed VCS.

FIG. 21 illustrates a flow diagram of operations performed by the system to restore a deleted ETL Object from a Distributed VCS Repository. In the first operation of FIG. 21, at the box 2102, the system provides an option to the user to browse all the deleted artifacts present in a trunk or branch of the VCS Repository configured with the ETL Tool. Next, at the box 2104, the system provides a filter option to find a version of the artifact that has been deleted in the VCS Repository, from which the user can restore a version-controlled object with the ETL Tool. At the next operation, at box 2106, the system executes a copy operation provided by the VCS system to copy the deleted XML artifact to the file system present in the VCS Repository, in response to the ETL Developer selecting a restore option. Next, at the box 2108, the system pulls the version-controlled XML artifact from the remote Centralized VCS Repository to the local VCS repository of the user. At the box 2110, the system next exports the artifact from the local VCS Repository of the user to the working folder of the user, and parses the exported XML artifact to get inputs on the version-controlled child objects and their respective version numbers. At the box 2113, the system pulls artifacts from the remote VCS Repository to the local VCS Repository, that is, from the user local repository to the user working folder. The artifacts are pulled for each version-controlled child object. Next, at the box 2114, the system imports the restored XML artifacts as objects in the relational database repository of the ETL Tool, and provides inputs on the missing references after restoring XML artifacts as objects in the ETL Lastly, at the box 2116, the system maintains version metadata information of restored objects in the ETL Tool Repository of the user developer.

Figure 22:
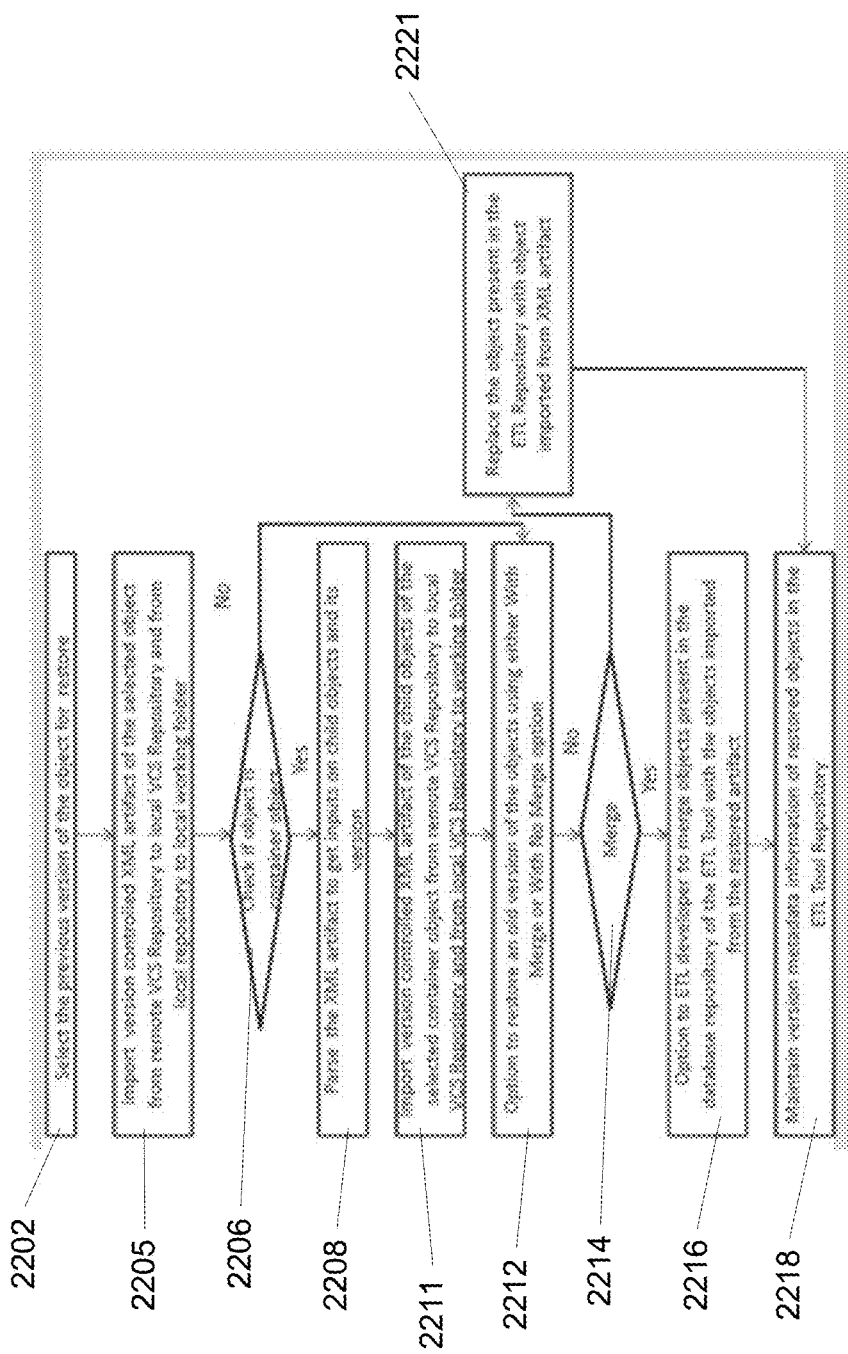
FIG. 22 illustrates a flow diagram of operations performed by the system to restore an ETL Object from a previous version when the ETL Tool is integrated with a Disttributed VCS.

FIG. 22 illustrates a flow diagram of operations performed by the system to restore an ETL Object from a previous version when the ETL Tool is integrated with a Distributed VCS. The first operation of FIG. 22, at the box 2202, is for the system to select the previous version of the object for the restore operation. Next, at box 2204, the system import a version-controlled XML artifact of the selected object from remote VCS Repository to the user local VCS Repository, and from the user local VCS repository to the user local working folder. At the decision box 2206, the system checks to determine if the object is a container object. If the outcome is affirmative, YES, the object is a container object, then operation proceeds to the box 2208, where the system parses the XML artifact to get inputs on child objects and the version of the XML artifact. At the box 2211, the system next imports a version-controlled XML artifact of the child objects of the selected container object from the remote VCS Repository to the user local VCS Repository, and from the user local VCS Repository to the user working folder. The next operation, at box 2212, is for the system to provide a user-selectable option to restore an old version of the objects using either a "With Merge" or "With No Merge" option. The system operation reaches the "merge option" box 2212 directly from the decision box 2206 if the outcome at the decision box 2206 is negative, meaning the object is not a container object. Next, after the "merge option" box 2212, the system operation reaches the decision box 2214, where the system awaits instruction from the user as to performing a merge operation. If the user instruction at box 2214 is affirmative, YES, perform a merge operation, then the system performs a merge operation and then at the box 2216, the system provides an option to the ETL user developer to merge objects present in the database repository of the ETL Tool with the objects imported from the restored XML artifact. Next, at the box 2218, the system performs operations to maintain version metadata information of restored objects in the ETL Tool Repository. If the outcome at the decision box 2214 was negative, NO, do not perform a merge operation, then the system proceeds directly to perform the operation of box 2221, to replace the object present in the ETL Repository with an object imported from the XML artifact.

Figure 23:
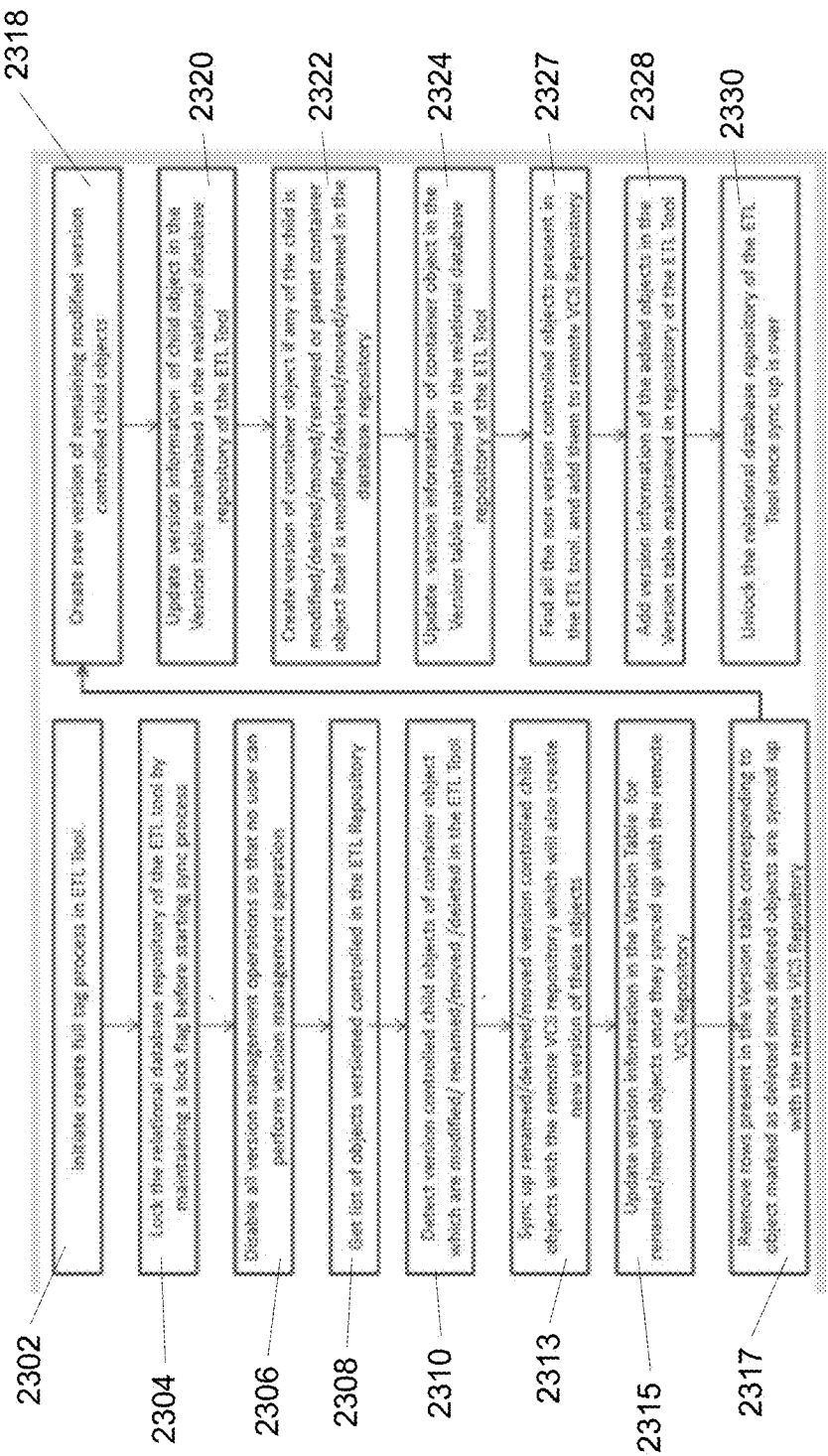
FIG. 23 illustrates a flow diagram of operations performed by the system to fully synchronize an ETL repository with a VCS repository when the ETL Tool is integrated with a Distributed VCS.

FIG. 23 illustrates a flow diagram of operations performed by the system to fully synchronize an ETL repository with a VCS repository when the ETL Tool is integrated with a Distributed VCS. In the first full sync operation, at box 2302 of FIG. 23, the system initiates the creation of a full tag process in the ETL Tool. A full tag (or label) is created using all the integration artifacts present in the repository, while a partial tag (or label) is created from selected artifacts present in the repository, along with its dependent artifacts. At the next operation, at box 2304, the system locks the relational database repository of the ETL tool by maintaining a lock flag before starting the full sync process. At the box 2306, the system disables all version management operations so that no user can perform a version management operation during the full sync operation. The system next, at box 2308, obtains a list of objects that are versioned-controlled in the ETL Repository. At the box 2310, the system detects version-controlled child objects of the container object that have been renamed, moved, or deleted in the ETL Tool. At the next box, the box 2313, the system synchronizes the modified-renamed-deleted-moved version-controlled child objects with the remote VCS repository, to which the system will respond by creating a new version of these objects. At the box 2315, the system updates version information in the Version Table for the renamed/moved objects once they have been synced up with the remote VCS Repository. Next, at the box 2317, the system removes rows present in the Version Table corresponding to any object marked as deleted once the deleted objects are synced up with the remote VCS Repository. At the box 2318, the system creates a new version of remaining modified version-controlled child objects. Next, at the box 2320, the system updates version information of any child object in the Version Table maintained in the relational database repository of the ETL Tool. At the box 2322, the system next creates a version of a container object if any of component of the child object is modified, deleted, moved, or renamed, or if the parent container object itself has been modified, deleted, moved, or renamed in the database repository. Next, at the box 2324, the system updates version information of any container object in the Version Table maintained in the relational database repository of the ETL Tool. At the box 2327, the system next finds all the non-version-controlled objects present in the ETL Tool. and adds them to the remote VCS Repository. At box 2328, the system adds version information of the added objects in the Version Table maintained in the repository of the ETL Tool. Lastly, at box 2330, the system unlocks the relational database repository of the ETL Tool once the full sync up process is completed.

Figure 24:
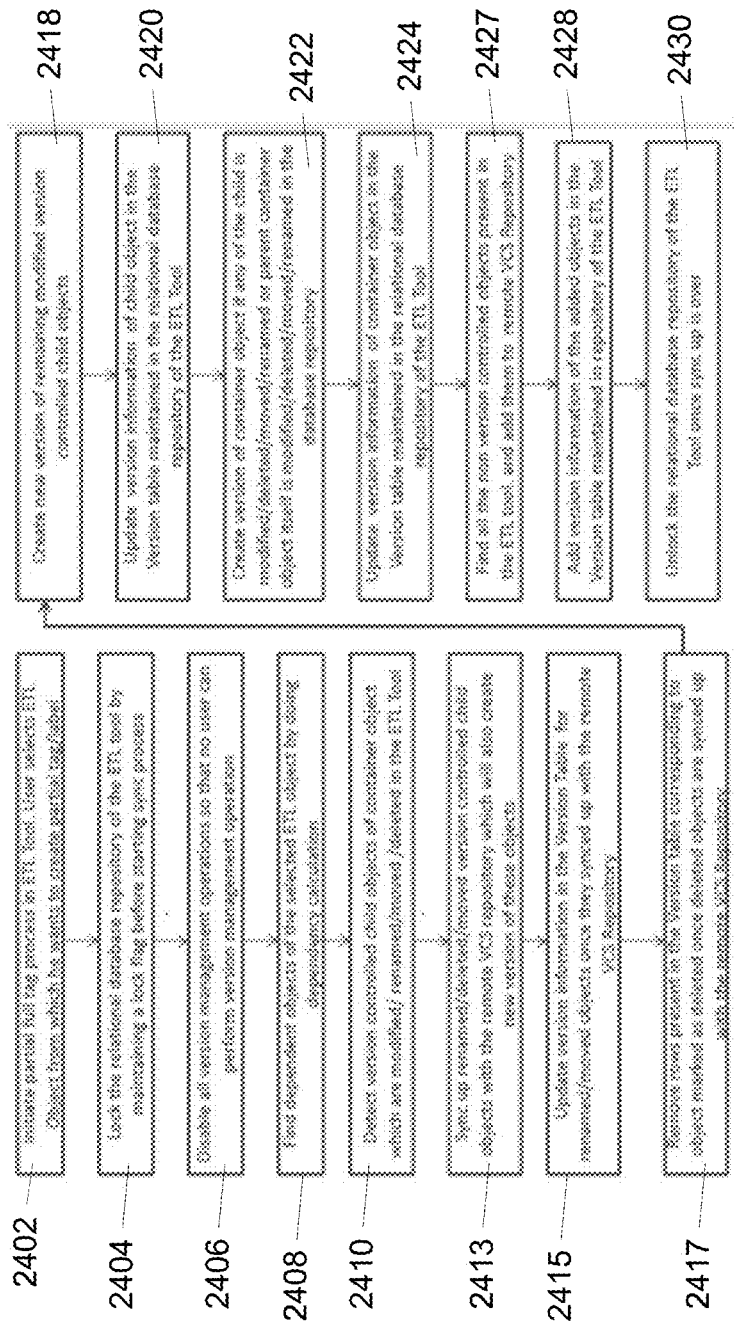
FIG. 24 illustrates a flow diagram of operations performed by the system to partially synchronize an ETL repository with a VCS repository when the ETL Tool is integrated with a Distributed VCS.

FIG. 24 illustrates a flow diagram of operations performed by the system to partially synchronize an ETL repository with a VCS repository when the ETL Tool is integrated with a Distributed VCS. In the first operation of FIG. 24, at box 2402, the system initiates a partial full tag process in ETL Tool. A full tag (or label) is created using all the integration artifacts present in the repository, while a partial tag (or label) is created from selected artifacts present in the repository, along with its dependent artifacts. In the box 2402 operation, the user selects an ETL Object from which the user wants to create a partial tag or label. At the box 2404, the system locks the relational database repository of the ETL tool by maintaining a lock flag before starting the partial sync process. Next, at the box 2406, the system disables all version management operations so that no user can perform version management operations during the partial sync process. At the box 2408, the system finds dependent objects of the selected ETL object by doing dependency calculations, as will be known by those skilled in the art. Next, at box 2410, the system detects version-controlled child objects of any container objects that are modified, renamed, moved, or deleted in the ETL Tool. At the box 2413, the system performs a synchronization of the renamed, deleted, or moved version-controlled child objects with the remote VCS Repository, an operation in response to which the system will also create new version of these objects. Next, at the box 2415, the system will update version information in the Version Table for renamed or moved objects, after such objects have been synced up with the remote VCS Repository. At the box 2417, the system removes rows present in the Version Table that correspond to any object marked as deleted, after the deleted objects are synced up with the remote VCS Repository. At the box 2418, the system next creates a new version of any remaining modified version-controlled child objects. The next operation, at the box 2420, is an operation in which the system updates version information of child objects in the Version Table as maintained in the relational database repository of the ETL Tool. At the box 2422, the system creates a version of a container object if any of the child objects have been modified, deleted, moved, or renamed, or if the parent container object itself is modified, deleted, moved, or renamed in the database repository. Next, at the box 2424, the system updates version information of any container object in the Version Table that is maintained in the relational database repository of the ETL Tool. At the box 2427, the system next finds all the non-version-controlled objects present in the ETL Tool and adds them to the remote VCS Repository. Next, at the box 2428, the system adds version information of the added objects in the Version Table as maintained in the repository of the ETL Tool. Lastly, at the box 2430, the system unlocks the relational database repository of the ETL Tool after the partial sync up operation has been completed.

Figure 25:
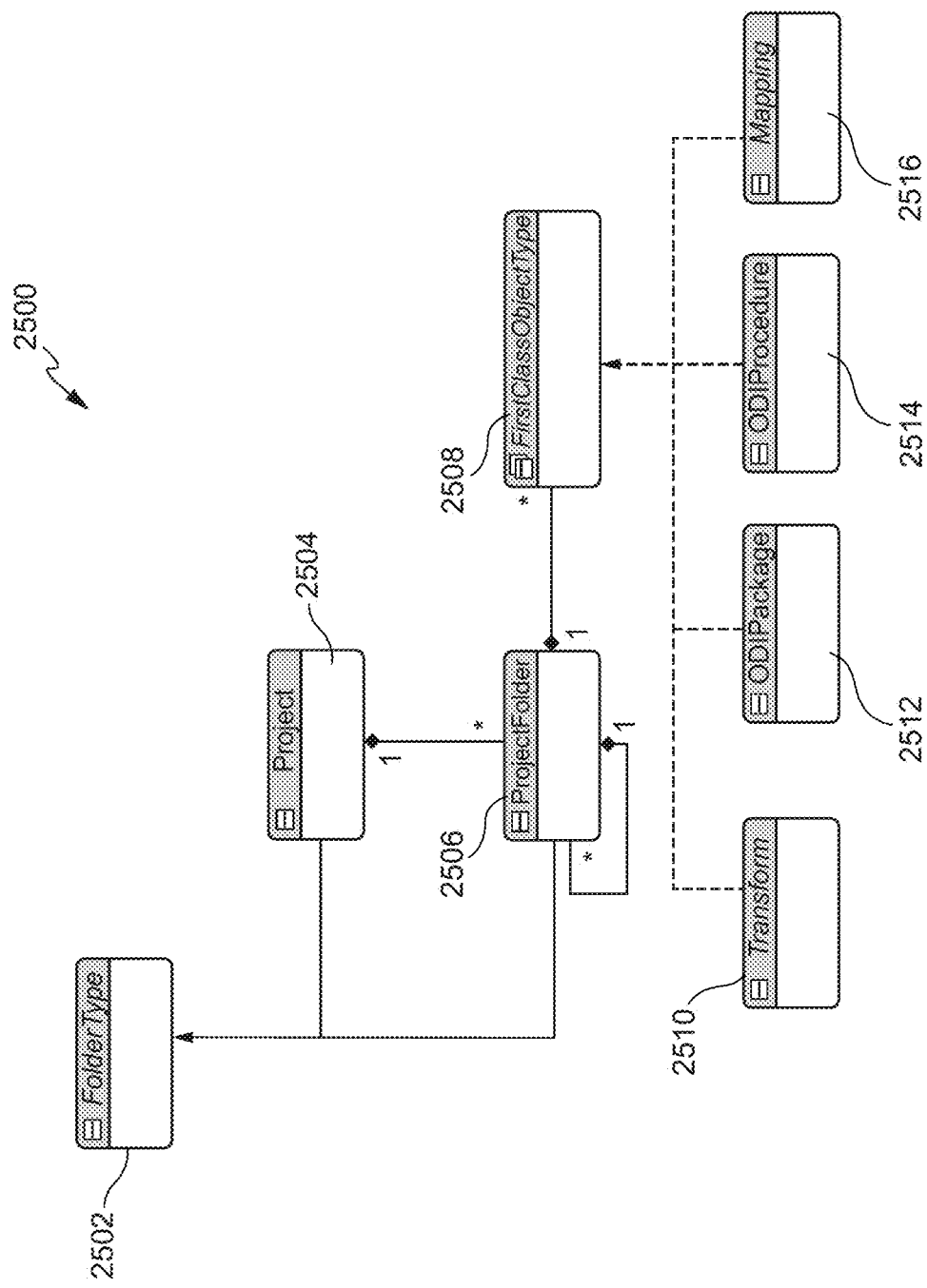
FIG. 25 is a diagram for a Folder Hierarchical Model for data stored in the system.

FIG. 25 is a diagram for a Folder Hierarchical Model 2500 for data stored in the system. The FIG. 25 drawing is a Unified Modeling Language representation that illustrates components of data objects that may be used in constructing the computer data environment in which the operations described herein are executed. Those skilled in the art will understand the data relationships depicted in FIG. 25 without further explanation. The FIG. 25 representation includes a Folder type object 2502 from which a Project object 2504 and Project Folder object 2506 may be constructed. FIG. 25 shows a FirstClassObjectType 2508 from which component objects of Transform 2510, ODPackage 2512, ODProcedure 2514, and Mapping 2516 are indicated. More particularly, FIG. 25 shows objects with the following features:

Project—is the typical top most container for your ETL application

Figure 26:
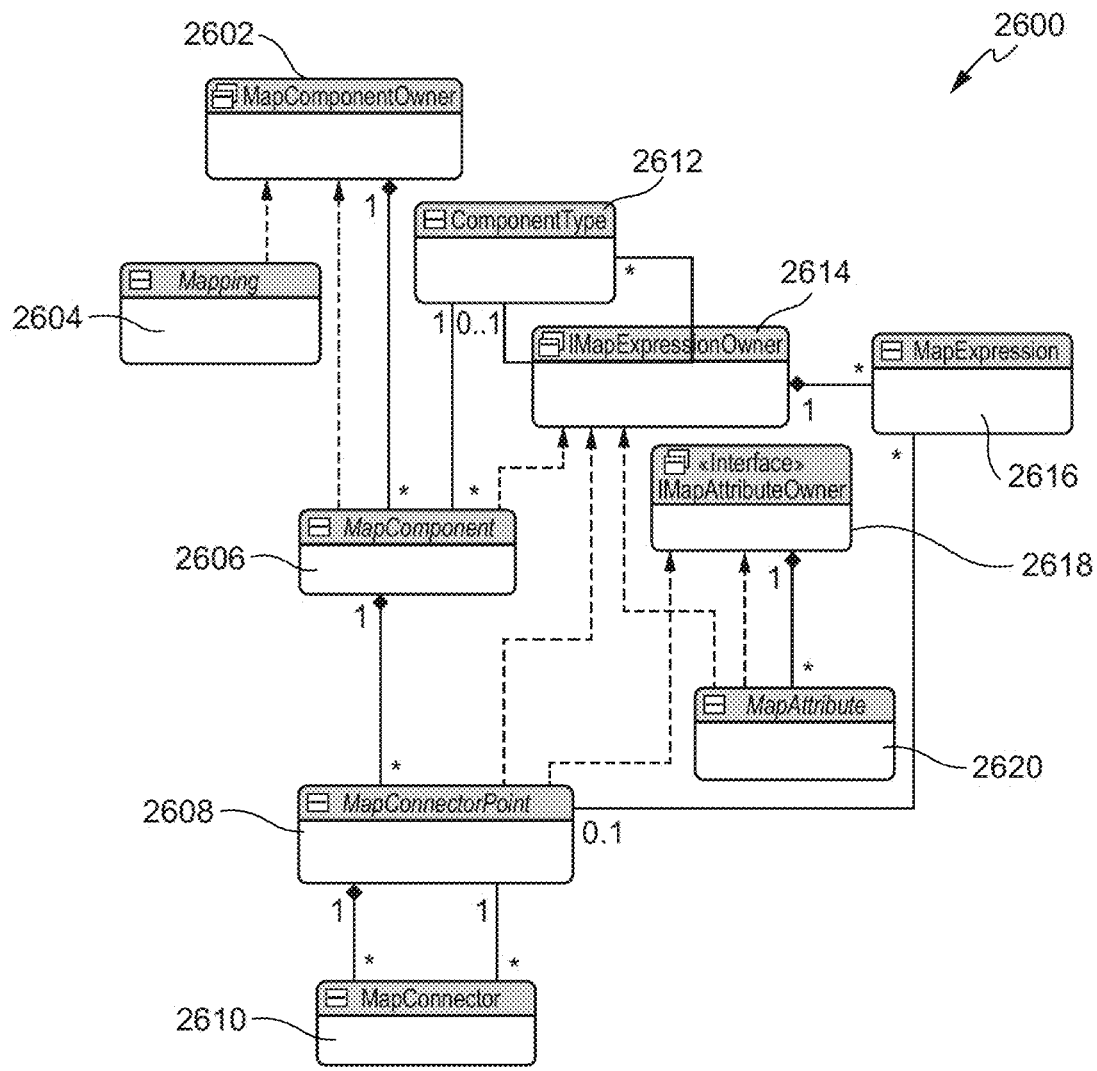
FIG. 26 is a diagram for a Mapping Model for data stored in the system.

ProjectFolder—represents folders contained in a Project; a ProjectFolder can recursively contain other ProjectFolders FolderType—interface representing the folder/container concept; this interface is implemented by both Project and ProjectFolder Mapping—a mapping consists of a set of transformations that define the ETL process of loading from one or more source datastores to one or more target datastores Transformation—represents an ETL function ODIProcedure—is a set of commands that can be executed at runtime ODIPackage—represents an execution control flow, and is made of steps organized in an execution graph FirstClassObjectType—interface representing the First Class Object concept; a First Class Object exists and can be manipulated independently, and is the unit of editing, locking, versioning, etc. Mapping, ODIProcedure, OdiPackage and Transformation are examples of First Class Objects FIG. 26 is a diagram for a Mapping Model for data stored in the system. The FIG. 26 drawing is a Unified Modeling Language representation that illustrates components of data objects that may be used in constructing the computer data environment in which the operations described herein are executed. Those skilled in the art will understand the data relationships depicted in FIG. 26 without further explanation. The FIG. 26 representation includes an IMapComponentOwner object type 2602 that has a data relationship with a Mapping object 2604 and a MapComponent object 2606. FIG. 26 shows that the MapComponent object 2606, in turn, has a data relationship with a MapConnectorPoint object 2608, which has a data relationship with a MapConnector object 2610, and the MapComponent object 2606 also has a data relationship with a ComponentType object 2612 and an IMapExpressionOwner object 2614, which also has a data relationship with the ComponentType object 2612. The IMapExpressionOwner object 2614 also has a data relationship with a MapExpression object 2616. An IMapAttributeOwner object 2618 provides an interface to a MapAttribute object 2620, which also has a data relationship with IMapExpressionOwner object 2614. More particularly, FIG. 26 shows an example of the complex relationships between objects that are defining an ETL mapping. Associations, compositions, and also inheritance relationships are all present in FIG. 26. A Mapping is composed of building blocks, called MappingComponents. MappingComponents are connected in a graph through MapConnectors. MapComponents usually contain MapAttributes, which may represent, for example, database table column definitions. A MapConnector connects the source and target component attributes through MapConnectorPoints. MapComponent, MapAttribute, and MapConnectorPoint may contain expressions expressed in a language, such as SQL. Interfaces such as IMapComponentOwner, IMapAttributeOwner, and IMapExpressionOwner are abstract entities that are aggregating and/or composing the corresponding objects.

In the foregoing specification, aspects of the invention are described with reference to specific embodiments thereof, but those skilled in the art can recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving a selection of an extraction, transport, transformation, and loading (ETL) object from which a partial tag is to be created for a partial sync process of a relational database repository of an ETL tool with a version control system (VCS) repository;
locking the relational database repository of an ETL tool by maintaining a lock flag before starting the partial sync process;
disabling all version management operations so that no user can perform version management operations during the partial sync process;
identifying dependent objects of the ETL object based on dependency calculations;
detecting version-controlled child objects of one or more container objects that are modified, deleted, moved, or renamed in the relational database repository of the ETL tool, wherein the one or more container objects include one or more among the ETL object and at least one dependent object among the dependent objects;
performing a synchronization of the version-controlled child objects with the VCS repository, wherein a new version of at least one version-controlled child object of the version-controlled child objects is created, and for each version-controlled child object among the version-controlled child objects:
based on the version-controlled child object having been renamed or moved, updating version information in a version table in the relational database repository of the ETL tool for the version-controlled child object after the version-controlled child object has been synced up with the VCS repository;
based on the version-controlled child object having been deleted, removing rows present in the version table that correspond to the version-controlled child object, after the version-controlled child object has been synced up with the VCS repository; and
based on the at least one version-controlled child object having been modified, creating a new version of the at least one version-controlled child object and updating version information of the at least one version-controlled child object, which has been modified, in the version table;
creating a new version of at least one container object of the one or more container objects based on the version-controlled child objects of the at least one container object that have been modified, deleted, moved, or renamed, or based on the at least one container object having been modified, deleted, moved, or renamed in the relational database repository of the ETL tool;
updating version information of the at least one container object in the version table;
identifying a plurality of non-version-controlled objects in the relational database repository of the ETL tool, and, for each non-version-controlled object of the plurality of non-version-controlled objects:
adding the non-version-controlled object to the VCS repository;
synchronizing the non-version-controlled object with the VCS repository; and
adding version information of the non-version-controlled object to the version table of the relational database repository of the ETL tool; and
unlocking the relational database repository of the ETL tool by removing the lock flag after the partial sync process has been completed.

2. A system comprising:
one or more processors; and
a memory coupled to the one or more processors, the memory storing one or more instructions that, when executed by the one or more processors, cause the one or more processors to perform a process including:
receiving a selection of an extraction, transport, transformation, and loading (ETL) object from which a partial tag is to be created for a partial sync process of a relational database repository of an ETL tool with a version control system (VCS) repository;
locking the relational database repository of an ETL tool by maintaining a lock flag before starting the partial sync process;
disabling all version management operations so that no user can perform version management operations during the partial sync process;
identifying dependent objects of the ETL object based on dependency calculations;
detecting version-controlled child objects of one or more container objects that are modified, deleted, moved, or renamed in the relational database repository of the ETL tool, wherein the one or more container objects include one or more among the ETL object and at least one dependent object among the dependent objects;
performing a synchronization of the version-controlled child objects with the VCS repository, wherein a new version of at least one version-controlled child object of the version-controlled child objects is created, and for each version-controlled child object among the version-controlled child objects:
based on the version-controlled child object having been renamed or moved, updating version information in a version table in the relational database repository of the ETL tool for the version-controlled child object after the version-controlled child object has been synced up with the VCS repository;
based on the version-controlled child object having been deleted, removing rows present in the version table that correspond to the version-controlled child object, after the version-controlled child object has been synced up with the VCS repository; and
based on the at least one version-controlled child object having been modified, creating a new version of the at least one version-controlled child object and updating version information of the at least one version-controlled child object, which has been modified, in the version table;
creating a new version of at least one container object of the one or more container objects based on the version-controlled child objects of the at least one container object that have been modified, deleted, moved, or renamed, or based on the at least one container object having been modified, deleted, moved, or renamed in the relational database repository of the ETL tool;
updating version information of the at least one container object in the version table;
identifying a plurality of non-version-controlled objects in the relational database repository of the ETL tool, and, for each non-version-controlled object of the plurality of non-version-controlled objects:
adding the non-version-controlled object to the VCS repository;
synchronizing the non-version-controlled object with the VCS repository; and
adding version information of the non-version-controlled object to the version table of the relational database repository of the ETL tool; and
unlocking the relational database repository of the ETL tool by removing the lock flag after the partial sync process has been completed.

3. A non-transitory computer readable storage medium storing instructions that, when executed by one or more processors of a computing device, cause the computing device to perform operations including:
receiving a selection of an extraction, transport, transformation, and loading (ETL) object from which a partial tag is to be created for a partial sync process of a relational database repository of an ETL tool with a version control system (VCS) repository;
locking the relational database repository of an ETL tool by maintaining a lock flag before starting the partial sync process;
disabling all version management operations so that no user can perform version management operations during the partial sync process;
identifying dependent objects of the ETL object based on dependency calculations;
detecting version-controlled child objects of one or more container objects that are modified, deleted, moved, or renamed in the relational database repository of the ETL tool, wherein the one or more container objects include one or more among the ETL object and at least one dependent object among the dependent objects;
performing a synchronization of the version-controlled child objects with the VCS repository, wherein a new version of at least one version-controlled child object of the version-controlled child objects is created, and for each version-controlled child object among the version-controlled child objects:
based on the version-controlled child object having been renamed or moved, updating version information in a version table in the relational database repository of the ETL tool for the version-controlled child object after the version-controlled child object has been synced up with the VCS repository;

based on the version-controlled child object having been deleted, removing rows present in the version table that correspond to the version-controlled child object, after the version-controlled child object has been synced up with the VCS repository; and based on the at least one version-controlled child object having been modified, creating a new version of the at least one version-controlled child object and updating version information of the at least one version-controlled child object, which has been modified, in the version table;

creating a new version of at least one container object of the one or more container objects based on the version-controlled child objects of the at least one container object that have been modified, deleted, moved, or renamed, or based on the at least one container object having been modified, deleted, moved, or renamed in the relational database repository of the ETL tool;

updating version information of the at least one container object in the version table;

identifying a plurality of non-version-controlled objects in the relational database repository of the ETL tool, and, for each non-version-controlled object of the plurality of non-version-controlled objects:
  adding the non-version-controlled object to the VCS repository;
  synchronizing the non-version-controlled object with the VCS repository; and
  adding version information of the non-version-controlled object to the version table of the relational database repository of the ETL tool; and unlocking the relational database repository of the ETL tool by removing the lock flag after the partial sync process has been completed.

* * * * *